(12) United States Patent
Kim et al.

(10) Patent No.: US 11,070,380 B2
(45) Date of Patent: Jul. 20, 2021

(54) AUTHENTICATION APPARATUS BASED ON PUBLIC KEY CRYPTOSYSTEM, MOBILE DEVICE HAVING THE SAME AND AUTHENTICATION METHOD

(71) Applicant: SAMSUNG ELECTRONICS CO., LTD., Suwon-si (KR)

(72) Inventors: Kitak Kim, Yongin-si (KR); Ji-Su Kang, Seoul (KR); Kiseok Bae, Yongin-si (KR); Jonghoon Shin, Hwaseong-si (KR); Kyoungmoon Ahn, Seoul (KR); Jinsu Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 627 days.

(21) Appl. No.: 15/212,343

(22) Filed: Jul. 18, 2016

(65) Prior Publication Data

US 2017/0099151 A1  Apr. 6, 2017

(30) Foreign Application Priority Data

Oct. 2, 2015 (KR) .................. 10-2015-0139168
Nov. 30, 2015 (KR) .................. 10-2015-0168664

(51) Int. Cl.
| | |
|---|---|
| *H04L 29/06* | (2006.01) |
| *H04L 9/32* | (2006.01) |
| *H04L 9/30* | (2006.01) |
| *H04L 9/06* | (2006.01) |
| *H04L 9/14* | (2006.01) |
| *H04W 12/069* | (2021.01) |

(52) U.S. Cl.
CPC .......... *H04L 9/3263* (2013.01); *H04L 9/0643* (2013.01); *H04L 9/14* (2013.01); *H04L 9/30* (2013.01); *H04L 9/3234* (2013.01); *H04L 9/3271* (2013.01); *H04L 63/0823* (2013.01); *H04W 12/069* (2021.01); *H04L 2209/80* (2013.01)

(58) Field of Classification Search
CPC ....... H04L 9/3263; H04L 9/14; H04L 9/0643; H04L 9/30; H04W 12/06
See application file for complete search history.

(56) References Cited

U.S. PATENT DOCUMENTS

| | | |
|---|---|---|
| 7,269,726 B1 | 9/2007 | Corella |
| 7,679,133 B2 | 3/2010 | Son et al. |

(Continued)

*Primary Examiner* — Shewaye Gelagay
*Assistant Examiner* — Carlton Johnson
(74) *Attorney, Agent, or Firm* — Volentine, Whitt & Francos, PLLC

(57) ABSTRACT

An authentication apparatus, included in a device supporting a network communication, includes a certificate handler that receives a certificate of an opponent and parses or verifies the certificate of the opponent. Cryptographic primitives receive an authentication request of the opponent, generate a random number in response to the authentication request, generate a challenge corresponding to the random number, and verify a response of the opponent corresponding to the challenge. A shared memory stores the parsed certificate, the random number, the challenge, and the response. An authentication controller controls the certificate handler, the cryptographic primitives, and the shared memory through a register setting, according to an authentication protocol.

20 Claims, 22 Drawing Sheets

(56) References Cited

U.S. PATENT DOCUMENTS

| | | |
|---|---|---|
| 8,000,469 B2 | 8/2011 | Buer et al. |
| 8,087,073 B2 | 12/2011 | Olson et al. |
| 8,112,626 B1 | 2/2012 | Adler et al. |
| 8,254,581 B2 | 8/2012 | Wan et al. |
| 8,291,229 B2 | 10/2012 | Vuillaume et al. |
| 8,522,035 B2 | 8/2013 | Sherkin et al. |
| 8,553,466 B2 | 10/2013 | Han et al. |
| 8,559,235 B2 | 10/2013 | Yoon et al. |
| 8,630,411 B2 | 1/2014 | Lim et al. |
| 8,654,587 B2 | 2/2014 | Yoon et al. |
| 8,694,783 B2 | 4/2014 | Fahn et al. |
| 9,111,283 B1 | 8/2015 | Diorio et al. |
| 9,223,958 B2 | 12/2015 | Rubinstein et al. |
| 2003/0126458 A1* | 7/2003 | Teramoto ............ G06F 12/1466 713/194 |
| 2005/0154889 A1 | 7/2005 | Ashley et al. |
| 2006/0150241 A1 | 7/2006 | Huh et al. |
| 2007/0060216 A1* | 3/2007 | Huang ................ A63F 13/00 455/575.3 |
| 2009/0136035 A1 | 5/2009 | Lee |
| 2010/0153719 A1 | 6/2010 | Duc et al. |
| 2011/0093714 A1 | 4/2011 | Schaecher et al. |
| 2011/0233648 A1 | 9/2011 | Seol et al. |
| 2015/0163059 A1 | 6/2015 | Neumann et al. |
| 2015/0222629 A1 | 8/2015 | Von Bokern et al. |

\* cited by examiner

FIG. 8

| | Writable Value | Writable Value | Writable Value |
|---|---|---|---|
| Initial State (S110) | Execution Value | Execution Value | |
| Waite State (S120) | Execution Value<br>Request Preparation Value | Request Preparation Value | |
| Challenge Generation State (S130) | Execution Value<br>Request Preparation Value<br>Challenge Value from 100 | Challenge Value from 100 | |
| Public Key & Response Input State (S140) | Execution Value<br>Request Preparation Value<br>Public Key Value of Opponent<br>Certificate Verification Value<br>Information Data<br>Response Value for Challenge | Public Key Value of Opponent<br>Certificate Verification Value<br>Information Data<br>Response Value for Challenge | |
| Public Key & Response Verification State (S150) | Execution Value<br>Request Preparation Value<br>Challenge Value from 100<br>Public Key Value of Opponent<br>Certificate Verification Value<br>Information Data<br>Response Value for Challenge<br>Intermediate Value<br>Hashed Value<br>Authentication Result Value | Intermediate Value<br>Hashed Value<br>Authentication Result Value | |
| End State (S160) | Authentication Result Value | None | |
| Fail State (S170) | Authentication Result Value | None | |

FIG. 15

| Operation Step | Readable Value | Writable Value |
|---|---|---|
| Initial State (S210) | Execution Value | Execution Value |
| Waite State (S220) | Execution Value<br>Request Preparation Value | Request Preparation Value |
| Challenge Generation State (S230) | Execution Value<br>Request Preparation Value<br>Challenge Value from 100 | Challenge Value from 100 |
| Public Key & Challenge Transmission State (S240) | Execution Value<br>Request Preparation Value<br>Challenge Value from 100<br>Certificate of 100 | None |
| Public Key & Response Input State (S250) | Execution Value<br>Request Preparation Value<br>Public key Value of Opponent<br>Certificate Verification Value<br>Information Data<br>Response Value for Challenge | Public key Value of Opponent<br>Certificate Verification Value<br>Information Data<br>Response Value for Challenge |
| Public key & Response Verification Stat (S260) | Execution Value<br>Request Preparation Value<br>Challenge Value from 100<br>Public key Value of Opponent<br>Certificate Verification Value<br>Information Data<br>Response Value for Challenge<br>Intermediate Value<br>Hashed Value<br>Authentication Result Value | Intermediate Value<br>Hashed Value<br>Authentication Result Value |
| Challenge Generation & Transmission State (S270) | Execution Value<br>Request Preparation Value<br>Challenge Value from 100<br>Secret Key of 100<br>Challenge from Opponent<br>Public Key Value of Opponent<br>Information Data<br>Intermediate Value<br>Hashed Value | Intermediate Value<br>Hashed Value |
| Shared Secret Key Generation State (S280) | Execution Value<br>Request Preparation Value<br>Challenge Value from 100<br>Challenge from Opponent<br>Intermediate Value<br>Hashed Value | Intermediate Value<br>Hashed Value |
| End State (S290) | Authentication Result Value | None |
| Fail State (S295) | Authentication Result Value | None |

AUTHENTICATION APPARATUS BASED ON PUBLIC KEY CRYPTOSYSTEM, MOBILE DEVICE HAVING THE SAME AND AUTHENTICATION METHOD

CROSS-REFERENCE TO RELATED APPLICATIONS

This U.S. non-provisional patent application claims priority under 35 U.S.C. § 119 to Korean Patent Applications No. 10-2015-0139168 filed Oct. 2, 2015, and No. 10-2015-0168664 filed Nov. 30, 2015, the entire contents of which are hereby incorporated by reference.

BACKGROUND

The disclosure described herein relates to an authentication apparatus based on a public key cryptosystem, a mobile device having the same, and an authentication method thereof.

An internet of things (IoT) means a technology that allows a variety of things including a sensor and a communication function to connect to an internet. Here, the things are various embedded systems such as a home appliance, a mobile device, a wearable device, and the like. In an IoT environment, various devices connect to a network for communication and data sharing, and thus the devices provide a service for a user. At this time, sensitive data associated with privacy of a user is transmitted through a network and is used at a service. To protect personal information and to provide a service, an authentication apparatus identifies another participant of a communication, thereby making it possible to protect privacy through an interaction with an authenticated participant and to provide a service which a user wants.

Nowadays, an authentication target is expanded, and thus there is required an authentication between components in a device. Even though a device is not a device in an IoT environment, when a function of a component among components is provided without an authentication, privacy is infringed due to an attack about sensitive data of a user. In addition, a fake product is manufactured through the reusing or unauthorized use of a specific component. In an authentication at the component level, a function of a genuine product certification is performed by identifying an opponent (e.g., component). Furthermore, a secure service is provided by protecting privacy of a user. Accordingly, there is required a lightweight authentication apparatus which is applied at a device level as well as a component level.

SUMMARY

Embodiments of the disclosure provide a lightened authentication apparatus, a mobile device having the same, and an authentication method thereof.

According to an embodiment of the disclosure, an authentication apparatus included in a device supporting a network communication may include a certificate handler configured to receive a certificate of an opponent and to parse or verify the certificate of the opponent. Cryptographic primitives receive an authentication request of the opponent to generate a random number in response to the authentication request, generate a challenge corresponding to the random number, and verify a response of the opponent corresponding to the challenge. A shared memory stores the parsed certificate, the random number, the challenge, and the response. An authentication controller controls the certificate handler, the cryptographic primitives, and the shared memory through a register setting according to an authentication protocol.

According to an embodiment of the disclosure, a mobile device may include a first component and a second component. At least one of the first or second components comprises an authentication apparatus. The authentication apparatus may include an authentication handler configured to receive, parse or verify a certificate of an opponent. Cryptographic primitives generate a random number, generate a challenge corresponding to the random number, verify a response of the opponent corresponding to the challenge, or generate a response of the authentication apparatus in response to a challenge of the opponent. A shared memory stores the parsed certificate, the random number, the challenge, and the response. An authentication controller controls the certificate handler, the cryptographic primitives, and the shared memory through a register setting according to an authentication protocol, when the mobile device transmits an authentication request to the opponent or the opponent transmits an authentication request to the mobile device.

According to an embodiment of the disclosure, an authentication method of an authentication apparatus may include receiving an authentication request from an opponent; setting a first register indicating the authentication request to be readable and writable; generating a first challenge in response to the authentication request; setting a second register storing the first challenge to be readable and writable; receiving a response corresponding to the first challenge and a first certificate from the opponent; and setting registers for storing the first certificate, a value for verifying the first certificate, information data, and the first response to be readable and writable. The method further includes verifying the first certificate and the first response and setting registers for storing an intermediate value or a result value, which is obtained in the verifying of the first certificate and the first response, to be readable and writable.

According to an embodiment of the disclosure, an authentication apparatus may receive an authentication request of an opponent, verify a response of the opponent in response to the authentication request, and may generate a response of the authentication apparatus corresponding to a challenge of the opponent.

According to an embodiment of the disclosure, an authentication apparatus includes a hash primitive that generates a challenge in response to an authentication request received from an opponent. A memory device stores the challenge. A control circuit receives the challenge from the memory device and transmits the challenge to the opponent. A certificate handler stores a certificate, received from the opponent in response to the challenge, in the memory device. The control circuit further stores a response, received from the opponent in response to the challenge, in the memory device. A public key accelerator primitive receives the response and certificate from the memory device and verifies the received response and certificate.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 8 is a table for describing management of internal information rights when an authentication apparatus according to an embodiment of the disclosure performs a unilateral authentication protocol;

FIG. 15 is a table for describing management of internal information rights when an authentication apparatus according to an embodiment of the disclosure performs a mutual authentication protocol;

DETAILED DESCRIPTION

Figure 1:
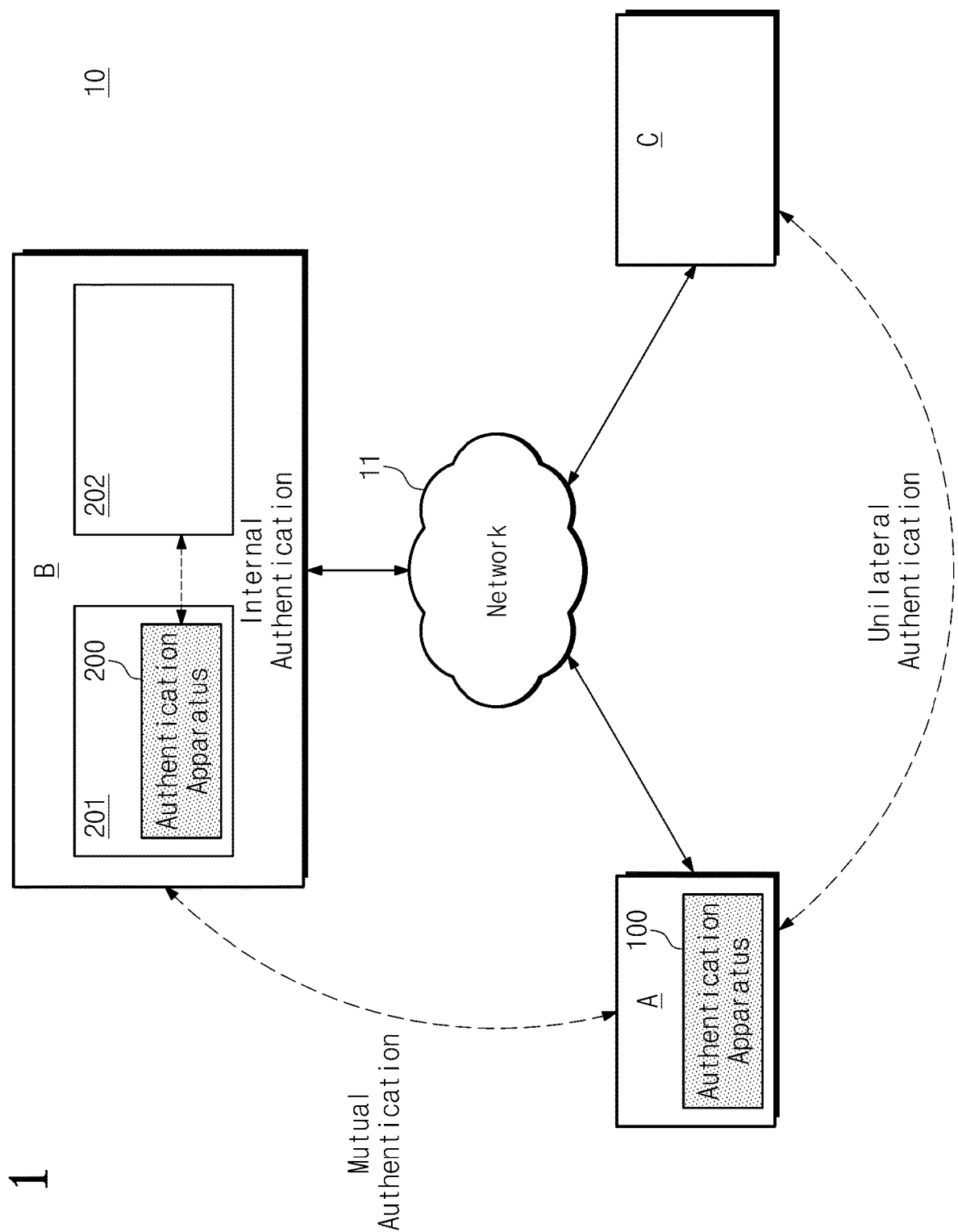
FIG. 1 is a schematic diagram illustrating a network system for performing an authentication method of devices.

The present disclosure will be described more fully hereinafter with reference to the accompanying drawings, in which exemplary embodiments of the disclosure are shown. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

An authentication apparatus, according to an embodiment of the disclosure, based on a public key cryptosystem may make it possible to reduce a size of a conventional memory, which each of multiple components independently uses, by sharing a memory and make it possible to eliminate a central processing unit (CPU) or a nonvolatile memory (NVM) by including a dedicated module which performs an authentication protocol. Accordingly, an authentication apparatus may be lightened.

The authentication apparatus may need cryptographic hardware which performs a function, which is necessary to provide a service based on a public key cryptosystem, at high speed. The reason may be that the public key cryptosystem includes a scheme or a protocol including operations of an integer which are based on a cryptographic hard problem requiring a high throughput. For example, the operations of an integer may include a modular addition, a modular subtraction, a modular multiplication, and a modular exponentiation. Moreover, the operations of an integer may include a point addition, a point doubling, a scalar multiplication, and a message digest which are on an elliptic curve.

Moreover, the authentication apparatus may be implemented by combining an executor of an integer operation and a hash executor for the message digest. At this time, each of the components may have a resource overlapped with each other. For example, each of the components may separately need a separate memory (e.g., a static random access memory (SRAM)) to perform a unique function. Because the memory is a resource overlapped between components, the memory may be used as a shared memory for optimization and light-weight of an authentication apparatus.

Moreover, a chip size of each of the components may be minimized by storing an internal variable of each of the components in a shared memory. In an embodiment, an authentication function of a product such as a flip-cover of a smartphone, a battery, or a power cable may be implemented so as to perform authentication after a service is provided or while a service is provided. When the authentication fails, a corresponding service may be immediately interrupted.

The authentication apparatus according to an embodiment of the disclosure may not include an independent central processing unit (CPU) for performing authentication based on a public key cryptosystem and a nonvolatile memory (NVM) which stores software (SW) for performing authentication. Moreover, an internal component of the authentication apparatus according to an embodiment of the disclosure may continuously access a shared memory and may operate. Components which independently operate may share a memory with each other and may use the shared memory. At this time, the components may share data, which the components need, through the shared memory.

FIG. 1 is a schematic diagram illustrating a network system for authenticating devices A and B each of which includes an authentication apparatus, according to an embodiment of the disclosure. Referring to FIG. 1, a network system 10 may include a network 11 for a wireless/wired connection among devices A, B, and C. In an embodiment, the network 11 may be an internet of things (IoT) network. In FIG. 1, for descriptive convenience, an embodiment of the disclosure is exemplified as three devices A, B, and C connected to the network 11. However, the scope and spirit of the disclosure may not be limited thereto. For example, the number of devices connecting to the network 11 may be four or more.

The first device A may include a corresponding authentication apparatus 100, and the second device B may include a corresponding authentication apparatus 200. Unlike the first and second devices A and B, the third device C may not include an authentication apparatus.

As illustrated in FIG. 1, an authentication method which is performed by the network system 10 for each device may be roughly classified into two manners. That is, there may be a mutual authentication between the device A including the authentication apparatus 100 and the device B including the authentication apparatus 200 and a unilateral authentication between the device A including the authentication apparatus 100 and the device B including the authentication apparatus 200 and between a device A or B including an authentication device 100 or 200 and the device C not including an authentication apparatus. In an embodiment, the first device A may be a flip cover encompassing a smartphone, the second device B may be a smartphone, and the third device C may be a device not including an authentication apparatus.

Moreover, an authentication apparatus (e.g., the authentication apparatus 200) may be used to perform an internal authentication between first and second components 201 and 202. The internal authentication may include a mutual authentication or a unilateral authentication, just as with the external authentication. In an embodiment, the first component 201 may be a display driver integrated chip (DDI) device, and the second component 202 may be a display device. An embodiment of the disclosure is exemplified in which a component 201 of the device B includes one authentication apparatus 200, in FIG. 1. However, the scope and spirit of the disclosure may not be limited thereto. For example, another component 202 of the device B may include an authentication apparatus. Although not illustrated in FIG. 1, a configuration of the authentication apparatus 100 in the first device A may be similar to a configuration of the authentication apparatus 200 in the second device B.

Meanwhile, the network system 10 illustrated in FIG. 1 is exemplified. However, the scope and spirit of the disclosure may not be limited thereto.

Figure 2:
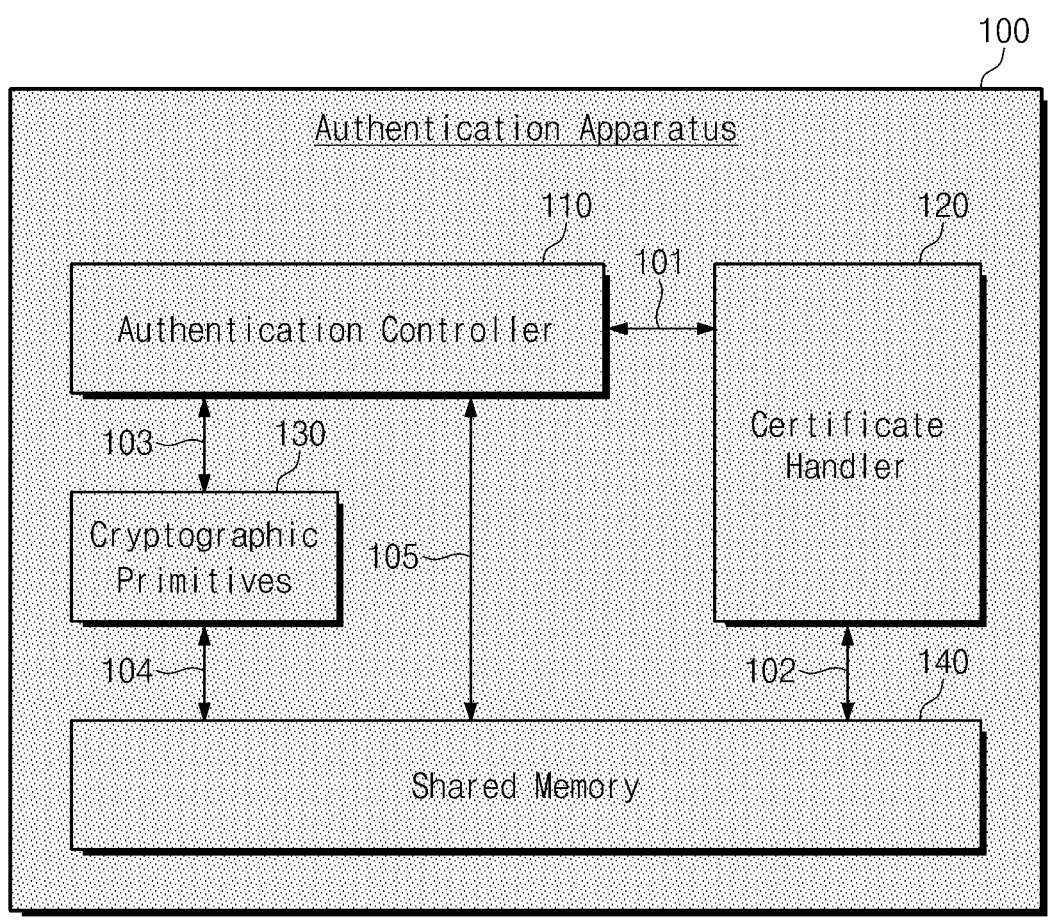
FIG. 2 is a block diagram illustrating an authentication apparatus according to an embodiment of the disclosure.

FIG. 2 is a block diagram illustrating an authentication apparatus 100 according to an embodiment of the disclosure. Referring to FIG. 2, an authentication apparatus 100 may include a plurality of components 110, 120, 130, and 140. In an embodiment, the authentication apparatus 100 may include an authentication controller 110, a certificate handler 120, cryptographic primitives 130, and a shared memory 140.

The authentication controller 110 may be implemented so as to perform an authentication protocol based on a public key cryptosystem. Here, the authentication protocol may be an external authentication protocol for communicating with an external device or an internal authentication protocol for communicating with an internal component. The authentication controller 110 may directly execute an authentication protocol through a communication with an opponent. For example, to perform an operation which is required when the authentication protocol is performed, the authentication controller 110 may repeatedly call out the components 120 and 130 each of which performs a unit operation. Moreover, the authentication controller 110 may sequentially adjust an operating point in time of each of the components 120 and 130, and thus the components 110, 120, and 130 may share the shared memory 140. That is, the authentication controller 110 may control the certificate handler 120, the cryptographic primitives 130, and a shared memory 140 to allow other components to use a value which is inputted to one component or outputted from one component through the shared memory 140. In an embodiment, through a register setting, the authentication controller 110 may control the certificate handler 120, the cryptographic primitives 130, and the shared memory 140 which are for the authentication protocol.

The certificate handler 120 may be implemented to manage a public key certificate. The certificate handler 120 may generate, parse, and verify the public key certificate. The certificate handler 120 may parse the public key certificate inputted from the opponent and may store the parsed public key certificate in the shared memory 140. For example, the certificate handler 120 may receive a public key certificate of the opponent and may verify whether the public key certificate of the opponent is valid, using a root certificate of a certificate authority (CA).

To manage a public key certificate, the certificate handler 120 may be implemented so as to frequently and continuously access the shared memory 140. That is, the certificate handler 120 may be implemented so as to store internal variables for generating or verifying a public key certificate in the shared memory 140.

The cryptographic primitives 130 may be implemented so as to perform a public key encryption operation, to perform a hash operation, or to generate a random number.

In an embodiment, when an authentication protocol is performed, the cryptographic primitives 130 may generate a challenge in response to an authentication request of the opponent. At this time, the challenge may be obtained by inputting a random number to a hash algorithm. Furthermore, the cryptographic primitives 130 may verify a response generated from the opponent in response to the challenge of the authentication apparatus 100. For example, the response inputted from the opponent may be a signature value obtained by certifying the challenge of the authentication apparatus 100 using a private key of the opponent. At this time, the cryptographic primitives 130 may verify the response (or the signature value) of the opponent by decoding the challenge using the response of the opponent and a public key certificate of the opponent.

Furthermore, the cryptographic primitives 130 may generate a response (or a signature value) of an authentication apparatus which corresponds to a challenge generated by the opponent.

In an embodiment, the cryptographic primitives 130 may generate a shared secret using a random number which is generated when an authentication protocol is performed.

To perform a public key encryption operation, to perform a hash operation, or to generate a random number, the cryptographic primitives 130 may be implemented so as to frequently and continuously access the shared memory 140. That is, the cryptographic primitives 130 may be implemented so as to store internal variables for an encryption operation, a hash operation, or generation of a random number in the shared memory 140.

The shared memory 140 may be implemented so as to store: (1) data for at least one operation of the authentication controller 110, the certificate handler 120 and the cryptographic primitives 130, (2) data generated during an operation, or (3) data according to a result of an operation. In an embodiment, the shared memory 140 may be implemented with a volatile memory, a nonvolatile memory, or a hybrid memory which is composed of a volatile memory and a nonvolatile memory. For example, the shared memory 140 may be a dynamic random access memory (DRAM), a static random access memory (SRAM), an embedded multimedia card (eMMC), or the like. An input/output control operation of the shared memory 140 may be performed under control of the authentication controller 120. That is, the authentication controller 120 may include a memory controller for controlling the shared memory 140.

In an embodiment, the components 110, 120, 130, and 140 of the authentication apparatus 100 may be implemented so as to connect to each other through data lines 101, 102, 103, 104, and 105. Each of the data lines 101, 102, 103, 104, and 105 may be used as an input/output line for transmitting internal data generated when an authentication protocol is performed.

The components 110, 120, and 130 of the authentication apparatus 100 according to an embodiment of the disclosure may share the shared memory 140. For this reason, input/output values of any one of the components 110, 120, and 130 may be shared by the remaining components. That is, the authentication apparatus 100 according to an embodiment of the disclosure may make it possible to reduce a size of a conventional memory which each of components independently uses, and thus the authentication apparatus 100 may be lightened.

Moreover, the authentication apparatus 100 according to an embodiment of the disclosure may include the component 110 dedicated for an authentication protocol, thereby making it possible to eliminate a central processing unit (CPU), which drives software for performing an authentication protocol, or a nonvolatile memory (NVM). That is, the authentication apparatus 100 may be lightened. In addition, because there is no need to store software for performing an authentication protocol, the authentication apparatus 100 according to an embodiment of the disclosure may make it possible to exclude the possibility that an error of authentication apparatus 100 occurs due to tampering with the software.

The authentication apparatus 100 according to an embodiment of the disclosure may perform an authentication protocol based on a public key cryptosystem by only using the authentication controller 110 for performing an authentication protocol and the certificate handler 120 for processing a public key certificate.

Meanwhile, the authentication apparatus 100 according to an embodiment of the disclosure may be applied to various devices and components, and thus the authentication apparatus 100 may provide a variety of authentication functions in various environments of the devices. The authentication protocol, which the authentication apparatus 100 according to an embodiment of the disclosure supports based on a public key cryptosystem, may be a unilateral authentication and a mutual authentication.

The components may collaboratively operate according to an operation for performing an authentication protocol. In an embodiment, in the case of the unilateral authentication, a result of an operation of the authentication apparatus 100 may be a result value of an identification of the opponent. In another embodiment, in the case of the mutual authentication, a result of an operation of the authentication apparatus 100 may be a result value of an identification of the opponent and a secret value which is used when a session key for a secret communication is generated after the result is generated. The secret value may be shared by the authentication apparatus 100 and the opponent.

Meanwhile, the authentication apparatus 100 illustrated in FIG. 2 is exemplified. However, the scope and spirit of the disclosure may not be limited thereto.

Figure 3:
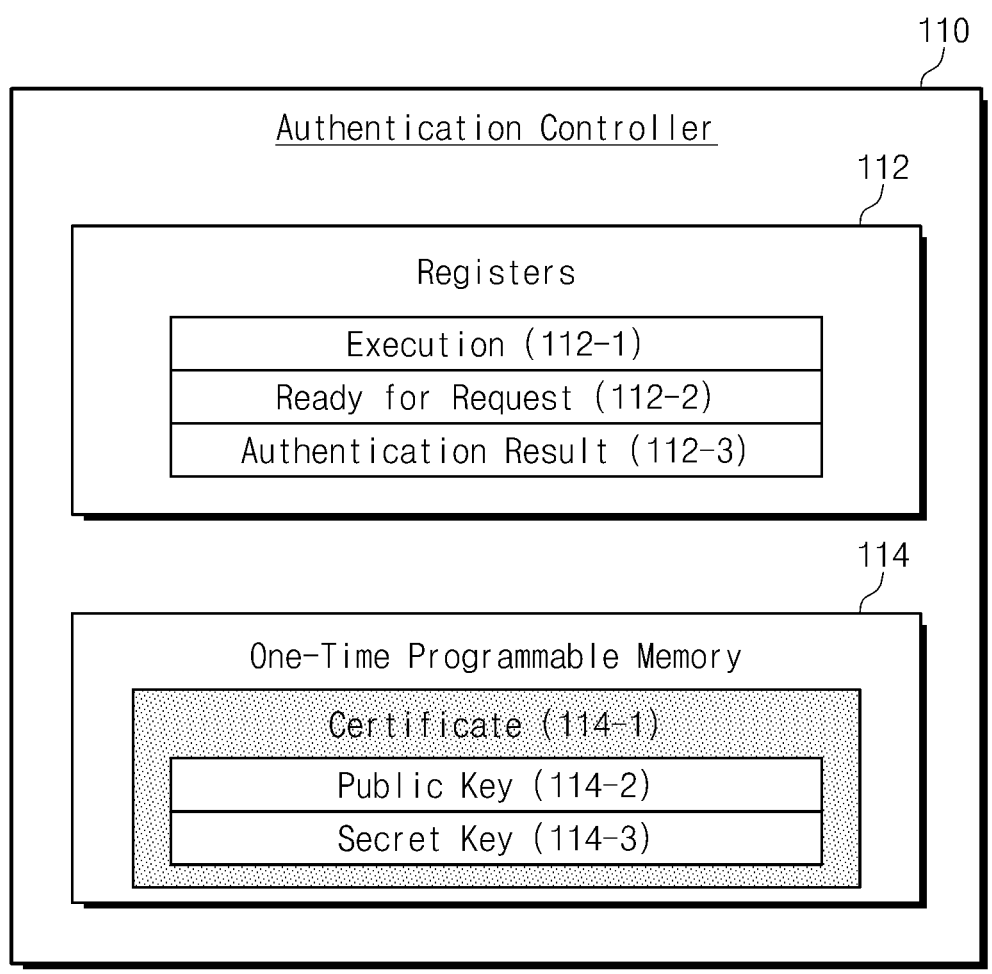
FIG. 3 is a block diagram illustrating an authentication controller illustrated in FIG. 2.

FIG. 3 is a block diagram illustrating an authentication controller 110 illustrated in FIG. 2. Referring to FIG. 3, the authentication controller 110 may include registers 112 and a one-time programmable memory 114.

The registers 112 may include a first register 112-1 which stores an execution value indicating that the authentication apparatus 100 begins an authentication protocol process, a second register 112-2 which stores a preparation value set when an authentication request is received, and a third register 112-3 which stores an authentication result value. When the first register 112-1 is set, the authentication apparatus 100 may begin an authentication protocol operation. When an authentication request is received from an external device, the second register 112-2 may be set. When an authentication protocol is successfully completed, the third register 112-3 may be set.

The one-time programmable memory 114 may be implemented so as to store a certificate 114-1 for the authentication apparatus 100. The certificate 114-1 may include a public key 114-2 and a secret key 114-3 of the authentication apparatus 100 which are required to perform an authentication protocol based on a public key cryptosystem. The one-time programmable memory 114 may be implemented so as to include a counter measure for protecting the secret key 114-3.

Meanwhile, the authentication controller 110 illustrated in FIG. 3 is exemplified. However, the scope and spirit of the disclosure may not be limited thereto.

Figure 4:
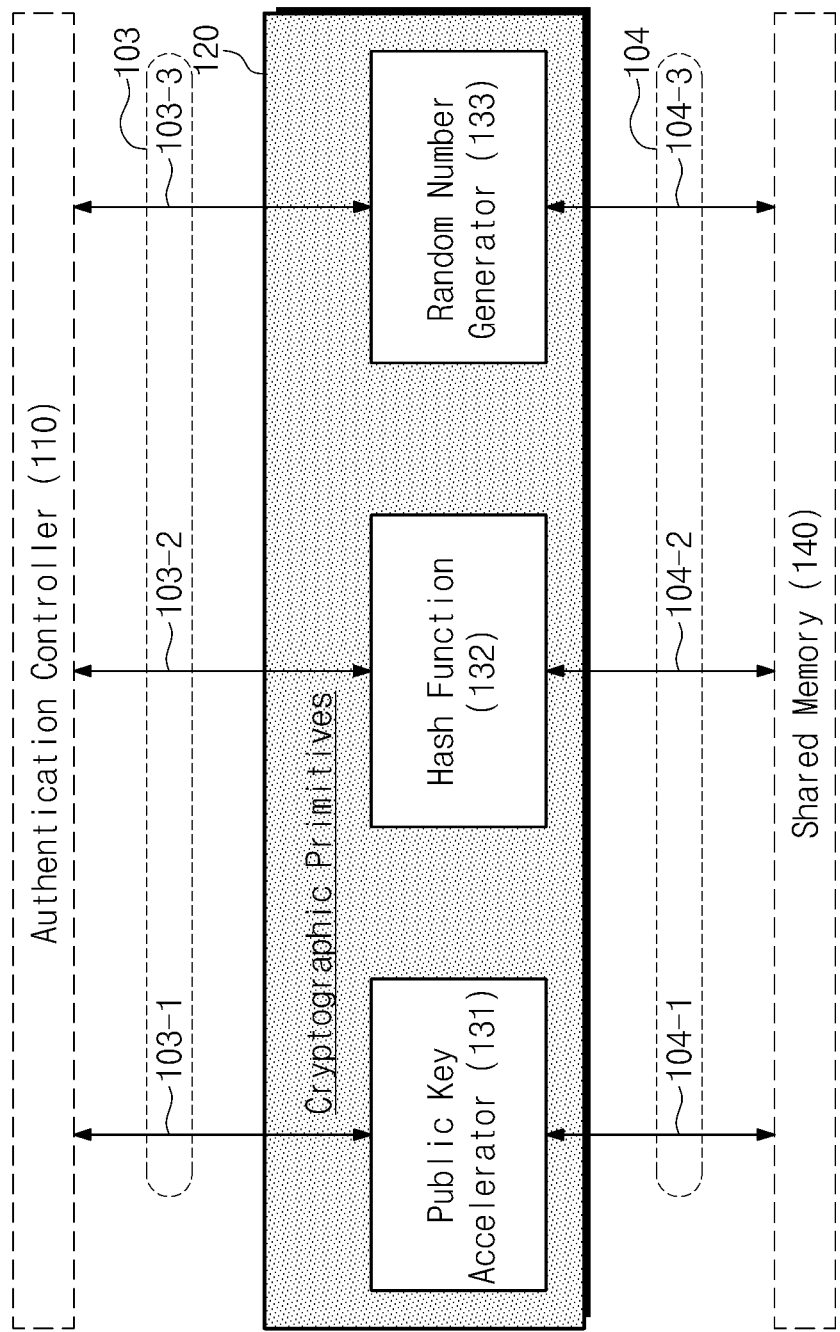
FIG. 4 is a block diagram illustrating cryptographic primitives illustrated in FIG. 2.

FIG. 4 is a block diagram illustrating cryptographic primitives 130 illustrated in FIG. 2. Referring to FIG. 4, the cryptographic primitives 130 may include a public key accelerator 131, a hash function 132, and a random number generator 133.

The public key accelerator 131 may be implemented so as to perform a modular operation or a point operation used for an authentication protocol. In an embodiment, the public key accelerator 131 may connect to the authentication controller 110 through a data line 103-1. In an embodiment, the public key accelerator 131 may connect to the shared memory 140 through a data line 104-1.

The hash function 132 may be implemented so as to perform a hash algorithm. In an embodiment, the hash function 132 may connect to the authentication controller 110 through a data line 103-2. In an embodiment, the hash function 132 may connect to the shared memory 140 through a data line 104-2.

The random number generator 133 may be implemented so as to generate a random number. In an embodiment, the random number generator 133 may connect to the authentication controller 110 through a data line 103-3. In an embodiment, the random number generator 133 may connect to the shared memory 140 through a data line 104-3.

Moreover, in an embodiment, the data lines 103-1, 103-2, and 103-3 may be included in the data line 103 illustrated in FIG. 2, and the data lines 104-1, 104-2, and 104-3 may be included in the data line 104 illustrated in FIG. 2.

Meanwhile, the cryptographic primitives 130 illustrated in FIG. 4 are exemplified. However, the scope and spirit of the disclosure may not be limited thereto.

Figure 5:
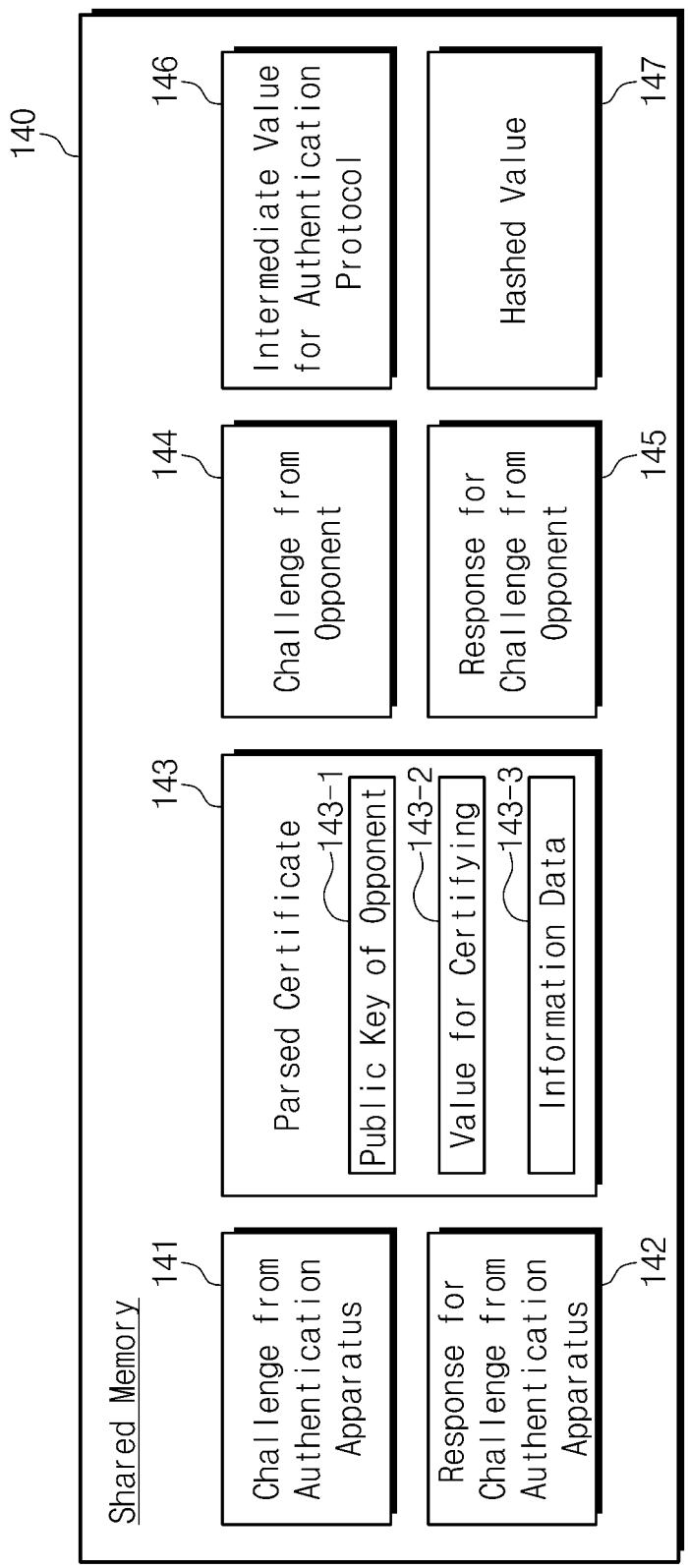
FIG. 5 is a block diagram illustrating data areas to be included in a shared memory when an authentication apparatus according to an embodiment of the disclosure performs an authentication protocol.

FIG. 5 is a block diagram illustrating data areas to be included in a shared memory 140 when an authentication apparatus 100 according to an embodiment of the disclosure performs an authentication protocol.

The shared memory 140 may include a first area 141 which stores a challenge of the authentication apparatus 100 generated by the authentication controller 110 when an authentication protocol is performed, a second area 142 which stores a response generated by an opponent in response to the challenge of the authentication apparatus 100, a third area 143 which stores a parsed certificate from the opponent, a fourth area 144 which stores a challenge transmitted from the opponent, a fifth area 145 which stores a response generated by the an authentication apparatus 100 in response to the challenge of the opponent, a sixth area 146 which stores an intermediate value for an authentication protocol, and a seventh area 147 which stores a hashed value which is a result value of a hash function. Here, the third area 143 may include an area 143-1 which stores a public key of the opponent, an area 143-2 which stores a value for signature verification, and an area 143-3 which stores information data for performing other authentication protocols.

Figure 6:
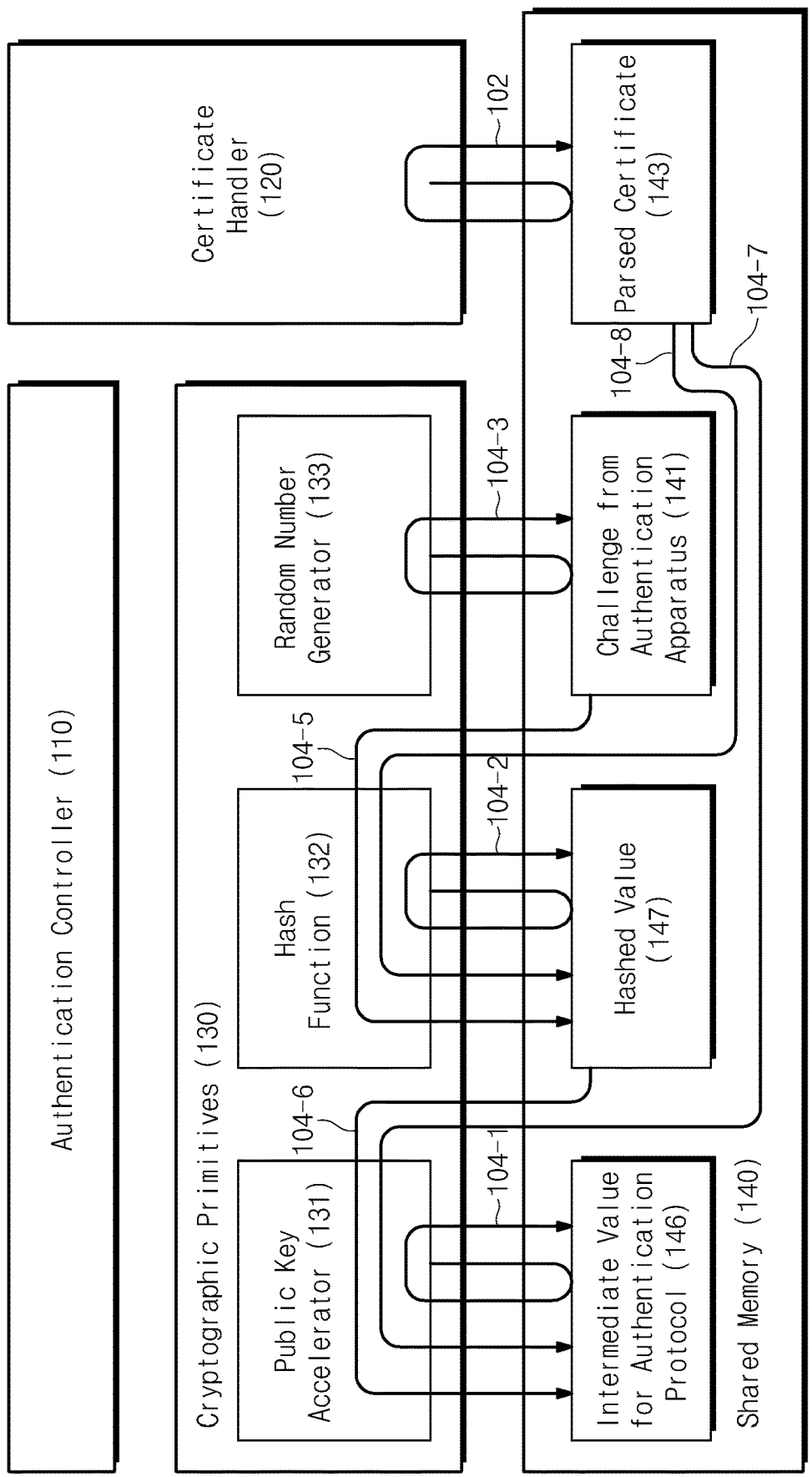
FIG. 6 is a block diagram for describing the reuse of input/output values, which are stored in a shared memory, of each of components in at least one of the components when an authentication apparatus according to an embodiment of the disclosure performs an authentication protocol.

FIG. 6 is a block diagram for describing the reuse of input/output values, which are stored in the shared memory 140, of each of components 110, 120, and 130 in at least one of components 110, 120, and 130 when an authentication apparatus 100 according to an embodiment of the disclosure performs an authentication protocol.

Input/output values of components 110, 120, and 130 may be stored, as described below. Input/output values of the public key accelerator 131 may be stored in the sixth area 146 of the shared memory 140 through the data line 104-1. Input/output values of the hash function 132 may be stored in the seventh area 147 of the shared memory 140 through the data line 104-2. Input/output values of the random number generator 133 may be stored in the first area 141 of the shared memory 140 through the data line 104-3. Input/output values of the certificate handler 120 may be stored in the third area 143 of the shared memory 140 through the data line 102.

Moreover, values stored in the shared memory 140 which are outputted from one component may be reused at another component, as described below. In an embodiment, a challenge value stored in the first area 141 may be reused at the hash function 132 through the data line 104-5, and the reused result value may be stored in the seventh area 147. In an embodiment, a hashed value stored in the seventh area 147 may be reused at the public key accelerator 131 through the data line 104-6, and the reused result value may be stored in the sixth area 146. In an embodiment, the parsed certificate of the third area 143 may be reused at the public key accelerator 131 through the data line 104-7, and the reused result value may be stored in the sixth area 146. In an embodiment, the parsed certificate of the third area 143 may be reused at the hash function 132 through the data line 104-8, and the reused result value may be stored in the seventh area 147.

Meanwhile, each of the components 110, 120, and 130 of the authentication apparatus 100 may frequently and repeatedly access the shared memory 140 and may generate an output value.

Meanwhile, a method of reusing input/output values of each of the components 110, 120, and 130 illustrated in FIG. 2 is exemplified. However, the scope and spirit of the disclosure may not be limited thereto.

Figure 7:
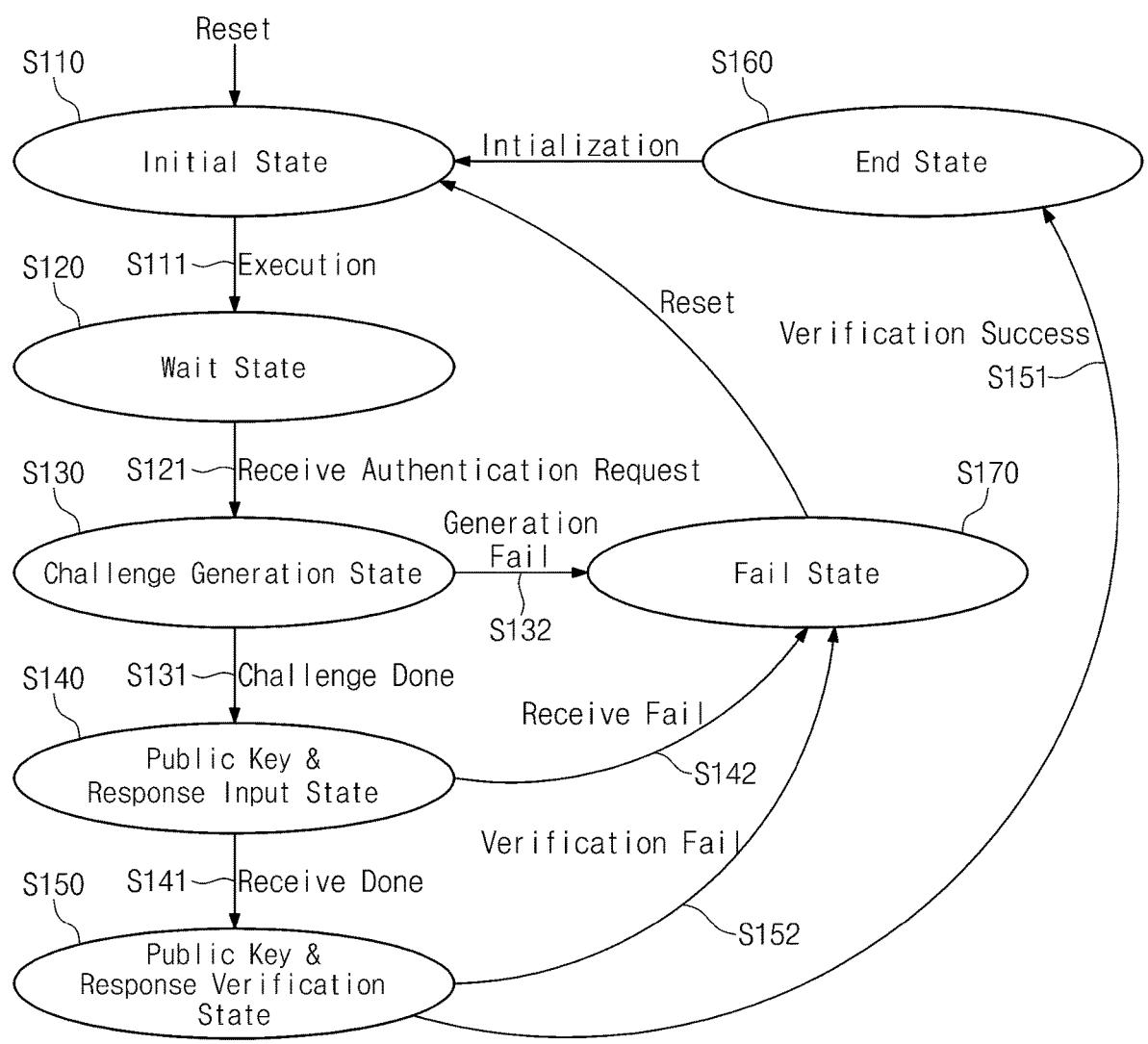
FIG. 7 is a state machine diagram for describing a procedure of performing a unilateral authentication protocol of an authentication apparatus according to an embodiment of the disclosure.

FIG. 7 is a state machine diagram for describing a procedure of performing a unilateral authentication protocol of an authentication apparatus according to an embodiment of the disclosure. Referring to FIGS. 1 to 7, a unilateral authentication protocol of the authentication apparatus 100 may be performed as described below.

When the authentication apparatus 100 is reset, the authentication apparatus 100 may transition to an initial state S110. Moreover, a state of the authentication apparatus 100 may be transitioned from an end state S160 to the initial state S110 by an initialization operation. Moreover, the state of the authentication apparatus 100 may be transitioned from a fail state S170 to the initial state S110 by a reset operation.

In a device including the authentication apparatus 100, when an authentication protocol is performed in response to an internal signal (S111), a state of the authentication apparatus 100 may be transitioned from the initial state S110 to a wait state S120. The authentication apparatus 100 may wait for an authentication request from an opponent which is a target of an authentication protocol at the wait state S120. When the authentication request is inputted from the opponent (S121), the state of the authentication apparatus 100 may be transitioned to a challenge generation state S130. At the challenge generation state S130, a challenge value may be generated from the random number generator 133 of the cryptographic primitives 130 (refer to FIG. 4). The generated challenge value may be transmitted to an external device (i.e., the opponent) which is placed outside the authentication apparatus 100. When the transmitting of the challenge is completed (S131), the state of the authentication apparatus 100 may be transitioned to a public key & response input state S140; otherwise, the state of the authentication apparatus 100 may be transitioned to the fail state S170 upon a failure of the challenge value generation S132. In the public key & response input state S140, a public key of the opponent, which wants to confirm an authorization, and a response corresponding to the challenge of the authentication apparatus 100 may be transmitted to the authentication apparatus 100. When the public key and the response of the opponent are inputted to the authentication apparatus 100 (S141), the state of the authentication apparatus 100 may be transitioned to a public key & response verification state S150; otherwise, the state of the authentication apparatus 100 may be transitioned to the fail state S170 upon a failure to receive the public key and/or response S142. At the public key & response verification state S150, verification may be performed with respect to the public key of the opponent. When the verification result indicates that the public key is a valid public key, the verification may be performed with respect to the response.

When the verification succeeds (S151), the state of the authentication apparatus 100 may be transitioned to the end state S160. On the other hand, when the verification fails (S152), the state of the authentication apparatus 100 may be transitioned to the fail state S170.

Meanwhile, the procedure of performing a unilateral authentication protocol illustrated in FIG. 7 is exemplified. However, the scope and spirit of the disclosure may not be limited thereto.

For example, the authentication apparatus 100 according to an embodiment of the disclosure may differently set a read/write right about values which are generated while the unilateral authentication protocol is performed at each operation step or values for performing the unilateral authentication protocol. That is, the values may be modified by an action of an attacker, and thus an influence due to the action affecting the authentication result may be blocked. To this end, the authentication controller 110 illustrated in FIG. 3 may adjust an access right about values which are stored in the registers 112 (refer to FIG. 3) according to an operating step of the authentication apparatus 100, or values which are stored in the one-time programmable memory 114 (refer to FIG. 3).

FIG. 8 is a table for describing management of internal information rights when an authentication apparatus according to an embodiment of the disclosure performs a unilateral authentication protocol.

At the initial state S110, an execution value may be readable and writable. At the wait state S120, the execution value may be readable, and a request preparation value may be readable and writable. At the challenge generation state S130, the execution value and the request preparation value may be readable, and a challenge value of the authentication apparatus 100 may be readable and writable. At the public key & response input state S140, the execution value and the request preparation value may be readable, and a public key value of an opponent, a certificate verification value, information data, and a challenge response value of the opponent may be readable and writable. At the public key & response verification state S150, the execution value, the request preparation value, a challenge value of an authentication apparatus 100, a public key value of the opponent, the certificate verification value, the information data, and the challenge response value of the opponent may be readable, and an intermediate value, a hashed value, and an authentication result value for an authentication protocol may be readable and writable. At the end state S160 and the fail state S170, the authentication result value may be readable and may not be writable.

In the embodiment, a read or write right setting may be implemented by a status register for storing a bit value.

Meanwhile, values except values in the table illustrated in FIG. 8 may not be readable and writable.

Figure 9:
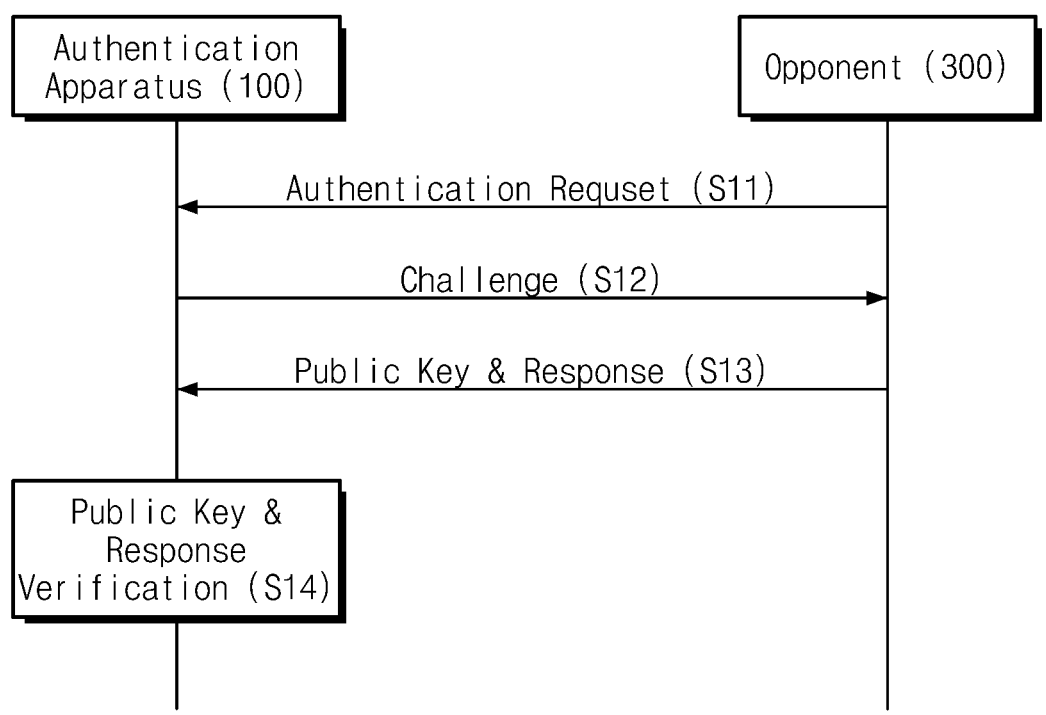
FIG. 9 is a ladder diagram for conceptually describing a unilateral authentication protocol of an authentication apparatus according to an embodiment of the disclosure.

FIG. 9 is a ladder diagram for conceptually describing a unilateral authentication protocol of an authentication apparatus 100 according to an embodiment of the disclosure. Referring to FIG. 9, a unilateral authentication protocol of the authentication apparatus 100 may be performed as described below. The authentication apparatus 100 may receive an authentication request from an opponent 300 (S11), may generate a challenge corresponding to the authentication request, and may transmit (S12) the challenge to the opponent 300. The opponent 300 may generate a response using the transmitted challenge. The authentication apparatus 100 may receive a public key and the response of the opponent 300 (S13) and may verify the public key and the response using a secret key of the authentication apparatus 100 (S14). Accordingly, the unilateral authentication protocol may be ended.

In an embodiment, the opponent 300 may be other components of the device B (refer to FIG. 1) including the authentication apparatus 100 or may be the device C (refer to FIG. 1) which is placed outside a device (i.e., the devices A or B) including the authentication apparatus 100.

Figure 10:
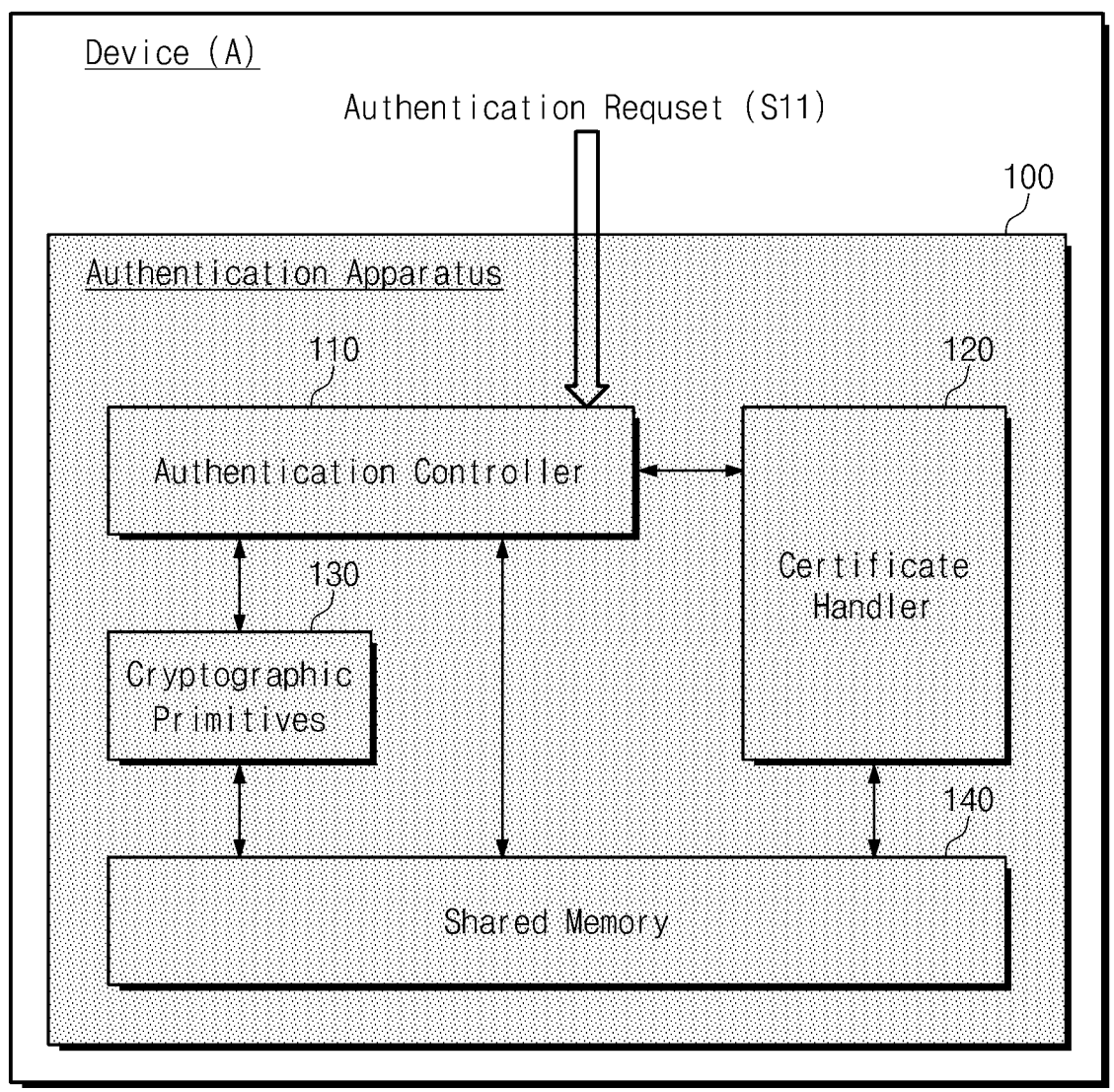
FIG. 10 is a block diagram for describing a procedure of receiving an authentication request when an authentication apparatus according to an embodiment of the disclosure performs a unilateral authentication protocol.

FIG. 10 is a block diagram for describing a procedure of receiving an authentication request when an authentication apparatus 100 according to an embodiment of the disclosure performs a unilateral authentication protocol. Referring to FIGS. 7 to 10, an authentication request may be inputted as described below. The authentication apparatus 100 may receive an authentication request at the wait state S120 (refer to FIG. 7) (S11). At this time, the authentication request may be inputted from the device A. The device A may receive the authentication request from any other component or may receive the authentication request from an external device which is placed outside the device A. The device A may transmit the authentication request to the authentication apparatus 100. In an embodiment, the authentication request may be inputted to the authentication controller 110.

Figure 11:
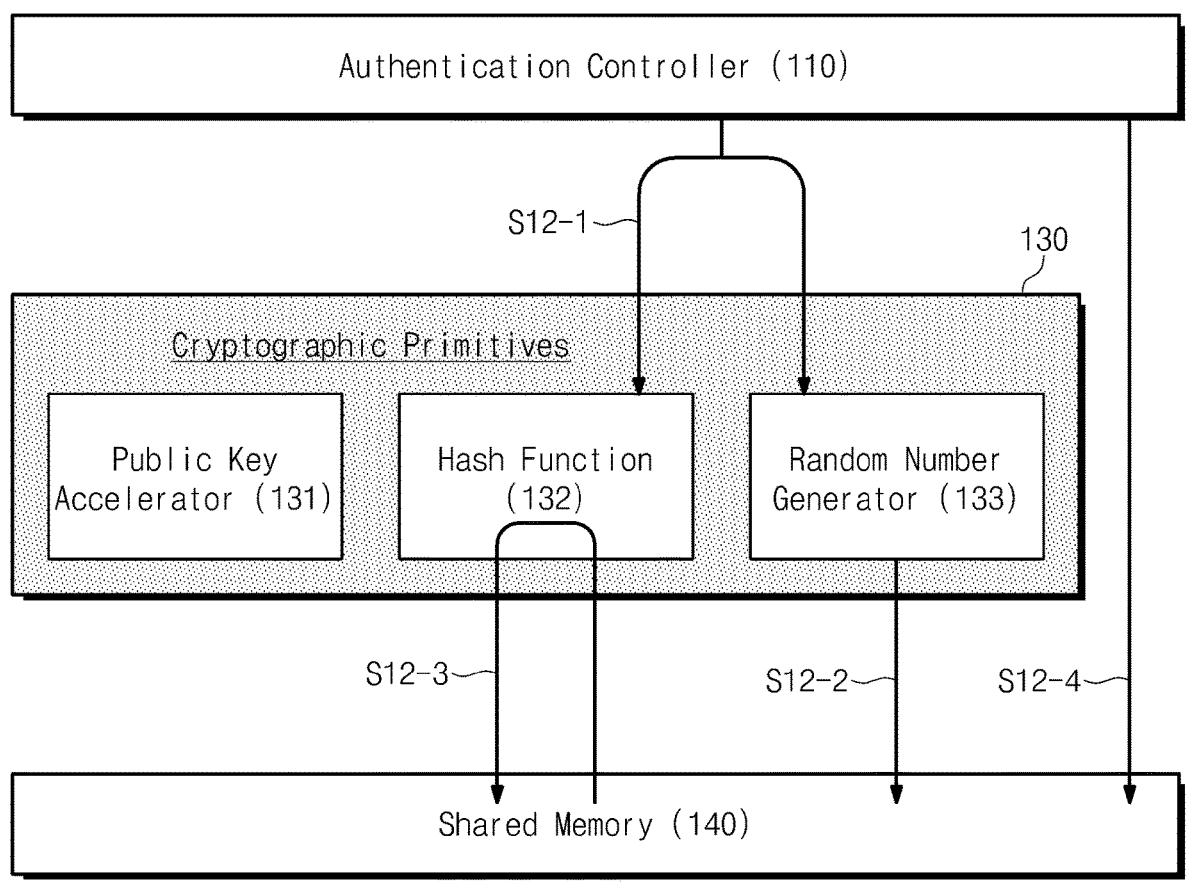
FIG. 11 is a block diagram for describing a procedure of generating a challenge corresponding to an authentication request when an authentication apparatus according to an embodiment of the disclosure performs a unilateral authentication protocol.

FIG. 11 is a block diagram for describing a procedure of generating a challenge corresponding to an authentication request when an authentication apparatus 100 according to an embodiment of the disclosure performs a unilateral authentication protocol. Referring to FIGS. 7 to 11, a procedure of generating a challenge will be described below. To generate a challenge, the authentication controller 110 may control the hash function 132 and the random number generator 133 in response to an authentication request (S12-1). The random number generator 133 may generate a seed value corresponding to the challenge under control of the authentication controller 110 and may transmit the seed value to the shared memory 140 (S12-2). The hash function 132 may generate a random value using the seed value under control of the authentication controller 110 and may transmit the random value to the shared memory 140 (S12-3). Here, the random value may be a challenge value. Meanwhile, as illustrated in FIG. 11, the procedure of generating the challenge using the hash function 132 and the random number generator 133 is exemplified. However, the scope and spirit of the disclosure may not be limited thereto.

In an embodiment, the authentication controller 110 may control an input/output operation of the shared memory 140 (S12-4).

Figure 12:
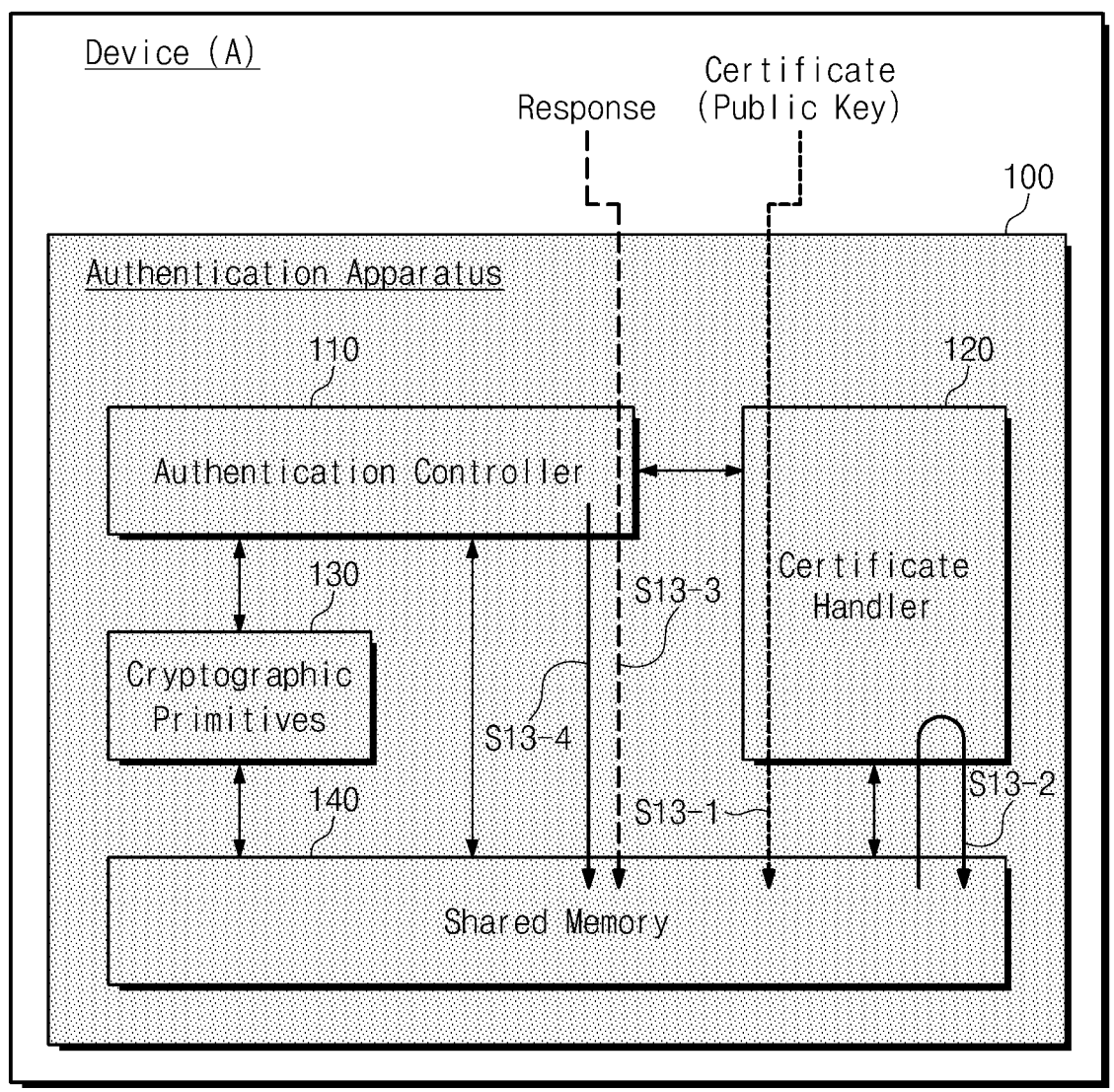
FIG. 12 is a block diagram for describing a procedure of receiving a public key certificate and a response of an opponent when an authentication apparatus according to an embodiment of the disclosure performs a unilateral authentication protocol.

FIG. 12 is a block diagram for describing a procedure of receiving a public key certificate and a response of an opponent when an authentication apparatus 100 according to an embodiment of the disclosure performs a unilateral authentication protocol. Referring to FIGS. 7 to 12, a procedure of receiving a public key certificate and a response of an opponent will be described below.

The authentication apparatus 100 may receive the public key certificate (including a public key) and a response corresponding to a challenge, which are received from the opponent 300. The public key certificate of the opponent 300 may be inputted to the certificate handler 120 and may be stored in the shared memory 140 (S13-1). The certificate handler 120 may process the public key certificate of the opponent 300 stored in the shared memory 140 based on a predefined sequence (S13-2). Moreover, the response of the opponent 300 may be stored in the shared memory 140 via the authentication controller 110 (S13-3). To input the public key certificate and the response, the authentication controller 110 may control an overall operation of the shared memory 140 (S13-4).

Figure 13:
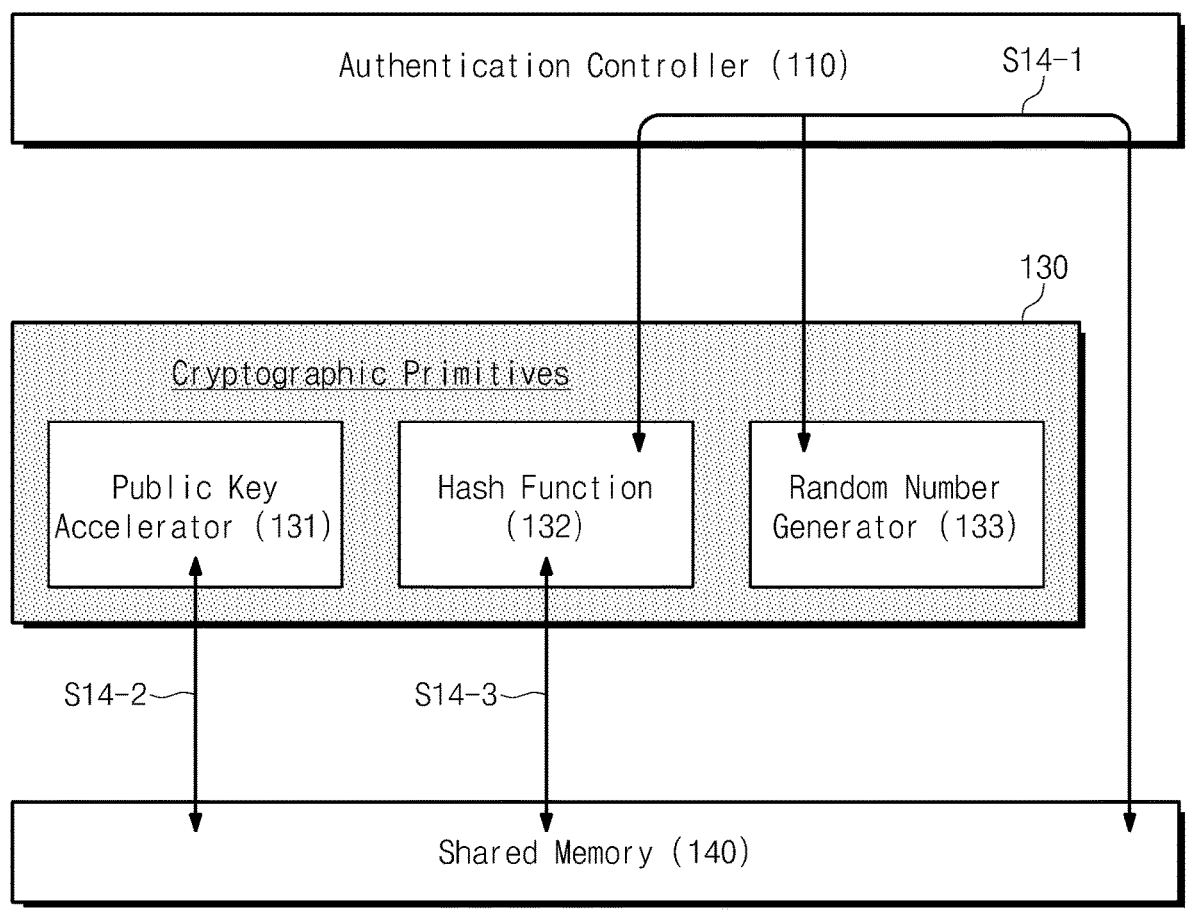
FIG. 13 is a block diagram for describing a procedure of verifying a public key certificate and a response of an opponent when an authentication apparatus according to an embodiment of the disclosure performs a unilateral authentication protocol.

FIG. 13 is a block diagram for describing a procedure of verifying a public key certificate and a response of an opponent when an authentication apparatus 100 according to an embodiment of the disclosure performs a unilateral authentication protocol. Referring to FIGS. 7 to 13, a procedure of verifying a public key certificate and a response of an opponent will be described below.

The authentication controller 110 may control the cryptographic primitives 130 and the shared memory 140 so as to repeatedly operate, and thus the authentication controller 110 may verify the public key certificate and the response (S14-1). The public key accelerator 131 may repeatedly access the shared memory 140 during a verification operation of the public key certificate and the response (S14-2). The hash function 132 may repeatedly access the shared memory 140 during the verification operation of the public key certificate and the response (S14-3).

Meanwhile, the authentication apparatus 100 according to an embodiment of the disclosure may be applied to a mutual authentication protocol.

Figure 14:
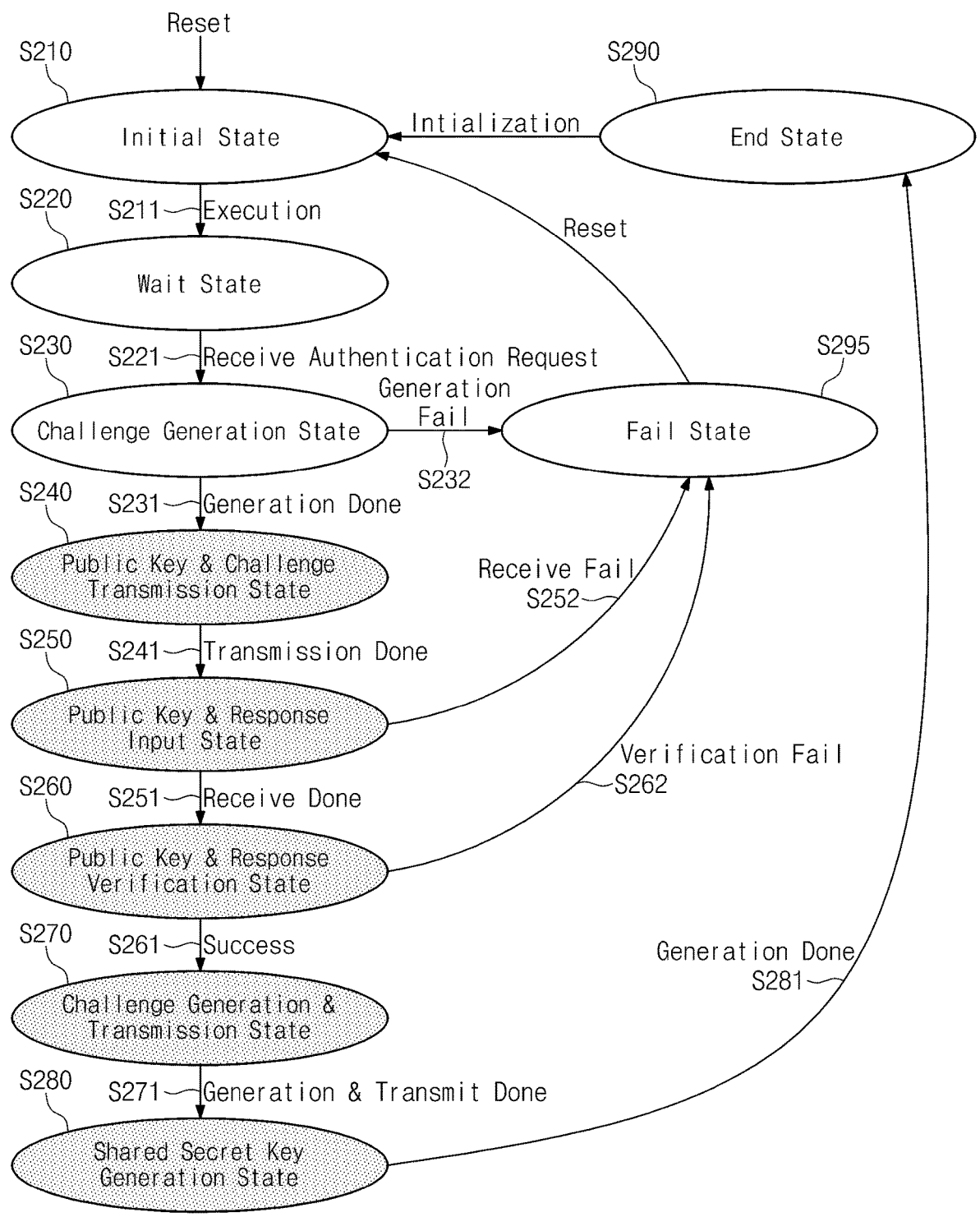
FIG. 14 is a state machine diagram for describing a procedure of performing a mutual authentication protocol of an authentication apparatus according to an embodiment of the disclosure.

FIG. 14 is a state machine diagram for describing a procedure of performing a mutual authentication protocol of an authentication apparatus according to an embodiment of the disclosure. Referring to FIGS. 1 to 6 and 14, a mutual authentication protocol of the authentication apparatus 100 may be performed as described below.

Each of S210, S220, and S230 may be performed so as to be the same as or similar to each of S110, S120, and S130 illustrated in FIG. 7, and thus the description thereof may be omitted. Similarly, the reset and initialization operations for entering the initial state S210 are the same as, or similar to, those described with respect to FIG. 7. And the execution operation S211, receive authentication request operation S221, and generation fail operation S232 are the same as, or similar to, those of operations S111, S121 and S132 in FIG. 7, respectively.

When a challenge for performing the mutual authentication protocol is generated (S231), the authentication apparatus 100 may transition to a public key and challenge state S240 and transmit (S241) a public key certificate having a public key of the authentication apparatus 100 and the challenge to an opponent while in the public key and challenge transmission state S240.

When the public key certificate having the public key and the challenge of the authentication apparatus 100 are transmitted to the opponent (S241), the authentication apparatus 100 enters the public key and response input state S250 and the opponent may verify the public key certificate and the challenge of the authentication apparatus 100 and may generate a public key certificate of the opponent, a challenge of the opponent, and a response of the opponent corresponding to the challenge of the authentication apparatus 100. The authentication apparatus 100 may receive a public key certificate and the response of the opponent (S251) and thereafter enter the public key and response verification state S260.

When the authentication apparatus 100 receives the public key certificate, the challenge, and the response of the opponent (S251), the authentication apparatus 100 may verify whether the public key certificate and the response of the opponent are valid while in the public key and response verification state S260. On the other hand, when the authentication apparatus 100 does not receive the public key certificate, the challenge, and the response of the opponent during a specific time, the state of the authentication apparatus 100 may be transitioned to a fail state S295 through a receive fail operation (S252).

When the verification succeeds (S261), the authentication apparatus 100 transitions to the challenge generation and transmission state S270 and may generate a response and may transmit the response to the opponent (S271). On the other hand, when the verification fails, the state of the authentication apparatus 100 may be transitioned to the fail state S295 of the mutual authentication protocol through a verification fail operation S262.

When the authentication apparatus 100 generates the response and transmits the response (S271), the authentication apparatus 100 transitions to a shared secret key generation state S280 and may generate a shared secret key (S281). When the shared secret key is generated (S281), the authentication apparatus 100 may end the mutual authentication protocol by transitioning to the end state (S290).

Meanwhile, the procedure of performing a mutual authentication protocol illustrated in FIG. 14 is exemplified. However, the scope and spirit of the disclosure may not be limited thereto.

For example, the authentication apparatus 100 according to an embodiment of the disclosure may differently set a read/write right about values which are generated when the mutual authentication protocol is performed at each operation step or values for performing the mutual authentication protocol.

FIG. 15 is a table for describing management of internal information rights when an authentication apparatus according to an embodiment of the disclosure performs a mutual authentication protocol.

At the initial state S210, an execution value may be readable and writable. At the wait state S220, an execution value may be readable and a request preparation value may be readable and writable. At the challenge generation state S230, the execution value and the request preparation value may be readable, and a challenge value of the authentication apparatus 100 may be readable and writable.

At the public key & challenge transmission state S240, the execution value, the request preparation value, the challenge value of the authentication apparatus 100, a public key certificate of the authentication apparatus 100 may be readable and may not be writable.

At the public key & response input state S250, the execution value and the request preparation value may be readable, and a public key certificate of an opponent, a certificate verification value, information data, and a response value corresponding to a challenge value of the authentication apparatus 100 may be readable and writable.

At the public key and response verification state S260, the execution value, the request preparation value, the challenge value of the authentication apparatus 100, the public key certificate of the opponent, the certificate verification value, the information data, and the response value of the opponent corresponding to the response of the authentication apparatus 100, may be readable, and an intermediate value, a hashed value, and an authentication result value for an authentication protocol may be readable and writable.

At the challenge generation & transmission state S270, the execution value, the request preparation value, the challenge value of the authentication apparatus 100, a secret key value of the authentication apparatus 100, a challenge from the opponent, a public key certificate of the opponent, and the information data may be readable, and the intermediate value, the hashed value, and an authentication result value may be readable and writable.

At the shared secret key generation state S280, the execution value, the request preparation value, the challenge value of the authentication apparatus 100, and a challenge value of the opponent may be readable, and the intermediate value, the hashed value, and the authentication result value may be readable and writable.

At the end state S290 and the fail state S295, the authentication result value may be readable and may not be writable.

Figure 16:
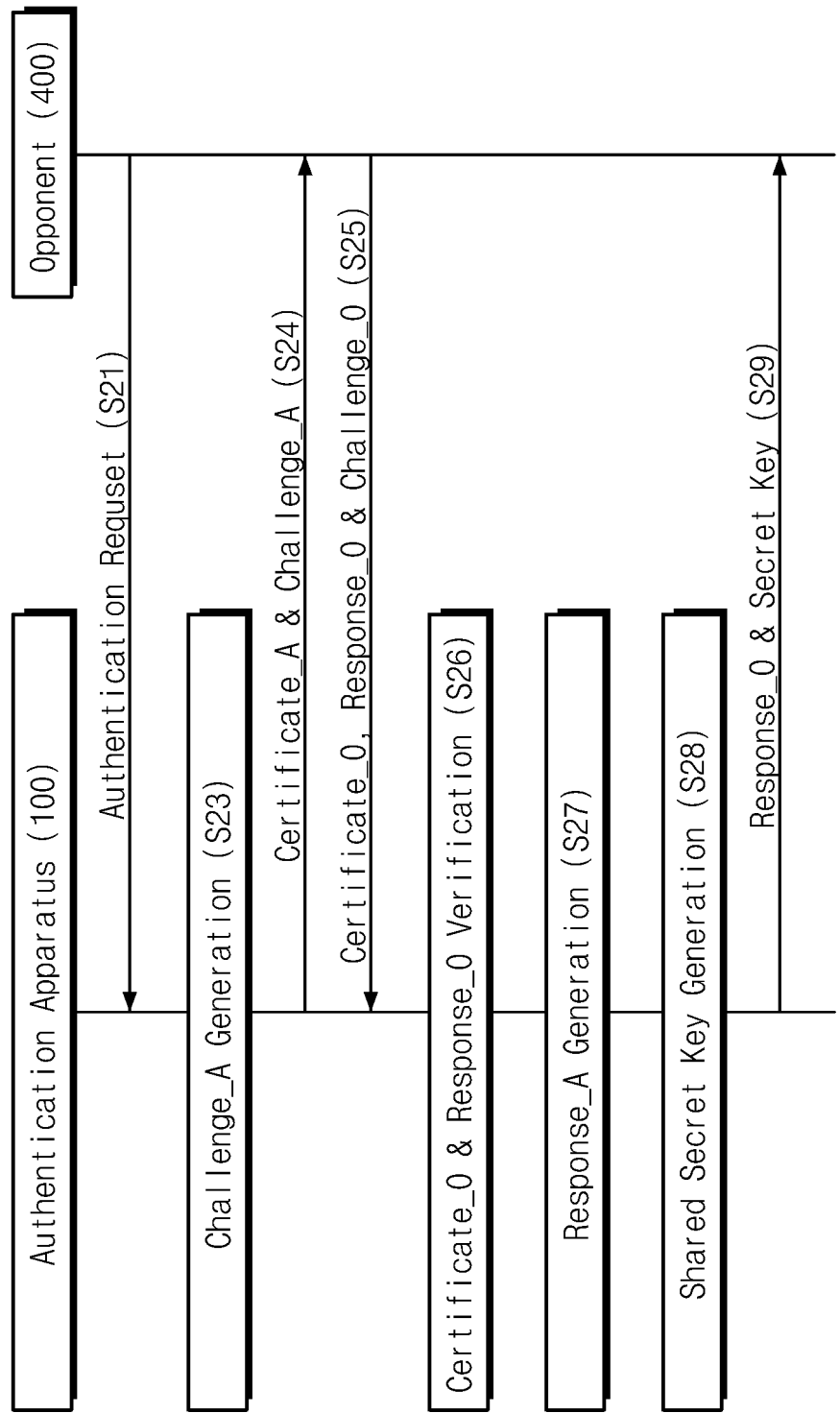
FIG. 16 is a ladder diagram for conceptually describing a mutual authentication protocol of an authentication apparatus according to an embodiment of the disclosure.

FIG. 16 is a ladder diagram for conceptually describing a mutual authentication protocol of an authentication apparatus 100 according to an embodiment of the disclosure. Referring to FIG. 16, a mutual authentication protocol of the authentication apparatus 100 may be performed as described below. The authentication apparatus 100 may receive an authentication request from an opponent 400 (S21) and may generate a challenge Challenge_A corresponding to the authentication request (S23). In the case of the mutual authentication protocol, the authentication apparatus 100 may transmit a certificate Certificate_A having a public key and the challenge Challenge_A of the authentication apparatus 100 to the opponent 400 (S24).

The opponent 400 may verify the transmitted certificate Certificate_A of the authentication apparatus 100 and may generate a response corresponding to the challenge Challenge_A of the authentication apparatus 100. When the verification result indicates that the certificate Certificate_A of the authentication apparatus 100 is valid, the opponent 400 may generate a response Response_O corresponding to the challenge Challenge_A of the authentication apparatus 100 and a challenge Challenge_O of the opponent 400.

The authentication apparatus 100 may receive a public key certificate Certificate_O, which has a public key, of the opponent 400, the response Response_O of the opponent 400, and the challenge Challenge_O of the opponent 400 (S25). The authentication apparatus 100 may verify the public key certificate Certificate_O of the opponent 400 and the response Response_O of the opponent 400 (S26). Afterwards, when the verification of the opponent 400 is valid, the authentication apparatus 100 may generate a response Response_A of the authentication apparatus 100 (S27). The authentication apparatus 100 may generate a secret key shared with the opponent 400 (S28). Afterwards, the authentication apparatus 100 may transmit the response Response_O indicating whether a mutual authentication protocol succeeds and the shared secret key to the opponent 400 (S29). Here, the shared secret key may be a session key.

Figure 17:
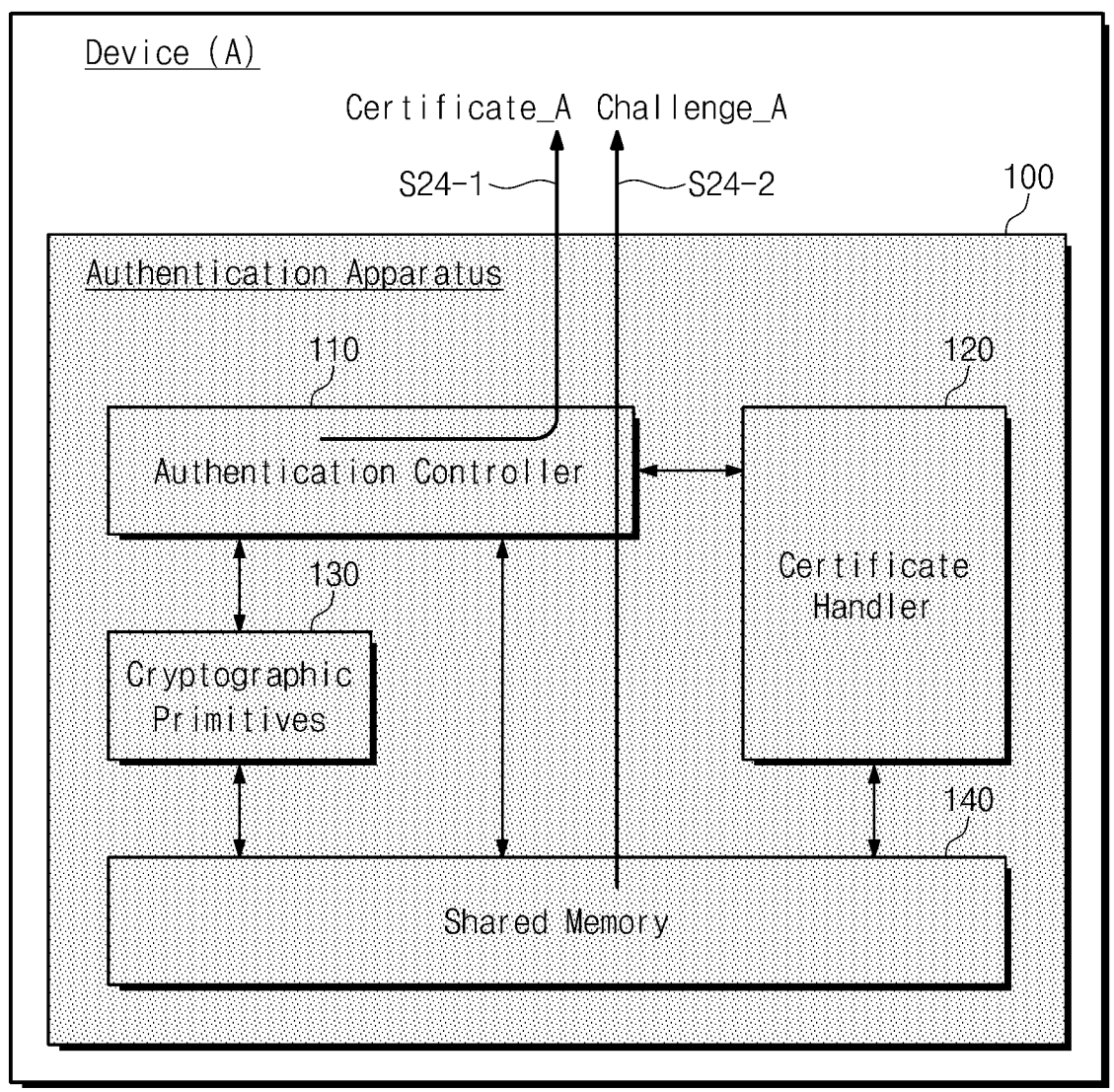
FIG. 17 is a block diagram for describing a procedure of transmitting a public key and a challenge of the authentication apparatus to an opponent when an authentication apparatus according to an embodiment of the disclosure performs a mutual authentication protocol.

FIG. 17 is a block diagram for describing a procedure of transmitting a public key and a challenge of the authentication apparatus 100 to an opponent 400 when an authentication apparatus 100 according to an embodiment of the disclosure performs a mutual authentication protocol.

The authentication apparatus 100 may generate a challenge Challenge_A in response to the authentication request of the opponent 400. A challenge generating method may be executed as described in FIG. 11. The generated challenge Challenge_A may be stored in the shared memory 140. To perform a mutual authentication protocol, the authentication apparatus 100 may transmit the certificate Certificate_A stored in the authentication controller 110 to the opponent 400 (S24-1). Moreover, the authentication apparatus 100 may transmit the challenge Challenge_A, which is stored in the shared memory 140, of the authentication apparatus 100 to the opponent 400 via the authentication controller 110 (S24-2).

Figure 18:
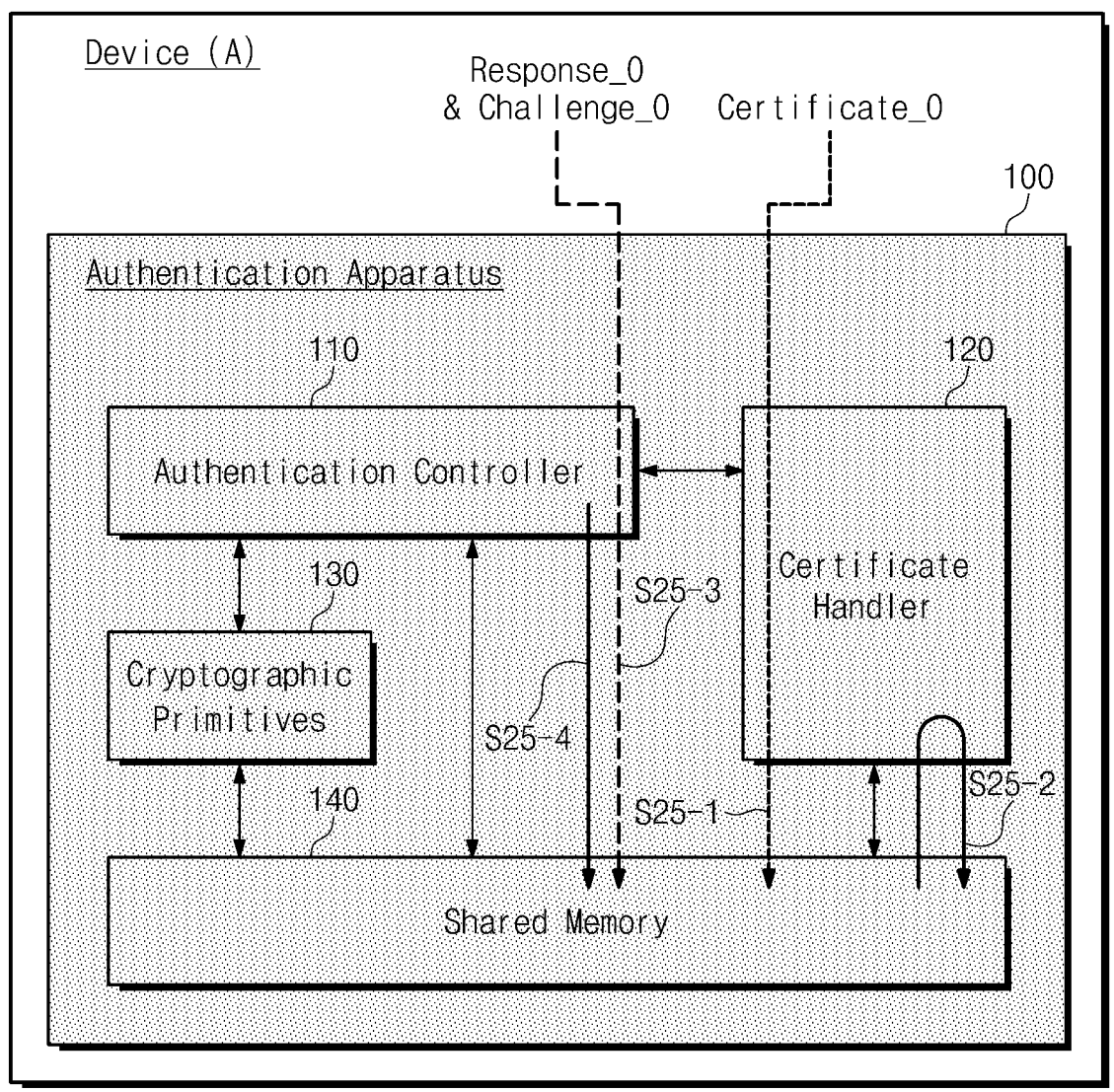
FIG. 18 is a block diagram for describing a procedure of receiving a public key certificate, a response, and a challenge of an opponent when an authentication apparatus according to an embodiment of the disclosure performs a mutual authentication protocol.

FIG. 18 is a block diagram for describing a procedure of receiving a public key certificate, a response, and a challenge of an opponent when an authentication apparatus 100 according to an embodiment of the disclosure performs a mutual authentication protocol. Referring to FIGS. 14 to 18, a procedure of receiving a public key certificate Certificate_O, a response Response_O, and a challenge Challenge_O of an opponent will be described below.

The authentication apparatus 100 may receive the public key certificate Certificate_O, the response Response_O, and the challenge Challenge_O of the opponent 400. The public key certificate Certificate_O of the opponent 400 may be stored in the shared memory 140 via the certificate handler 120 (S25-1). The certificate handler 120 may process the public key certificate Certificate_O of the opponent 400 stored in the shared memory 140 based on a predefined sequence (S25-2).

Moreover, a response Response_O and a challenge Challenge_O of the opponent 400 may be stored in the shared memory 140 via the authentication controller 110 (S25-3). To input the public key certificate Certificate_O, the response Response_O and the challenge Challenge_O, the authentication controller 110 may control an overall operation of the shared memory 140 (S25-4).

Figure 19:
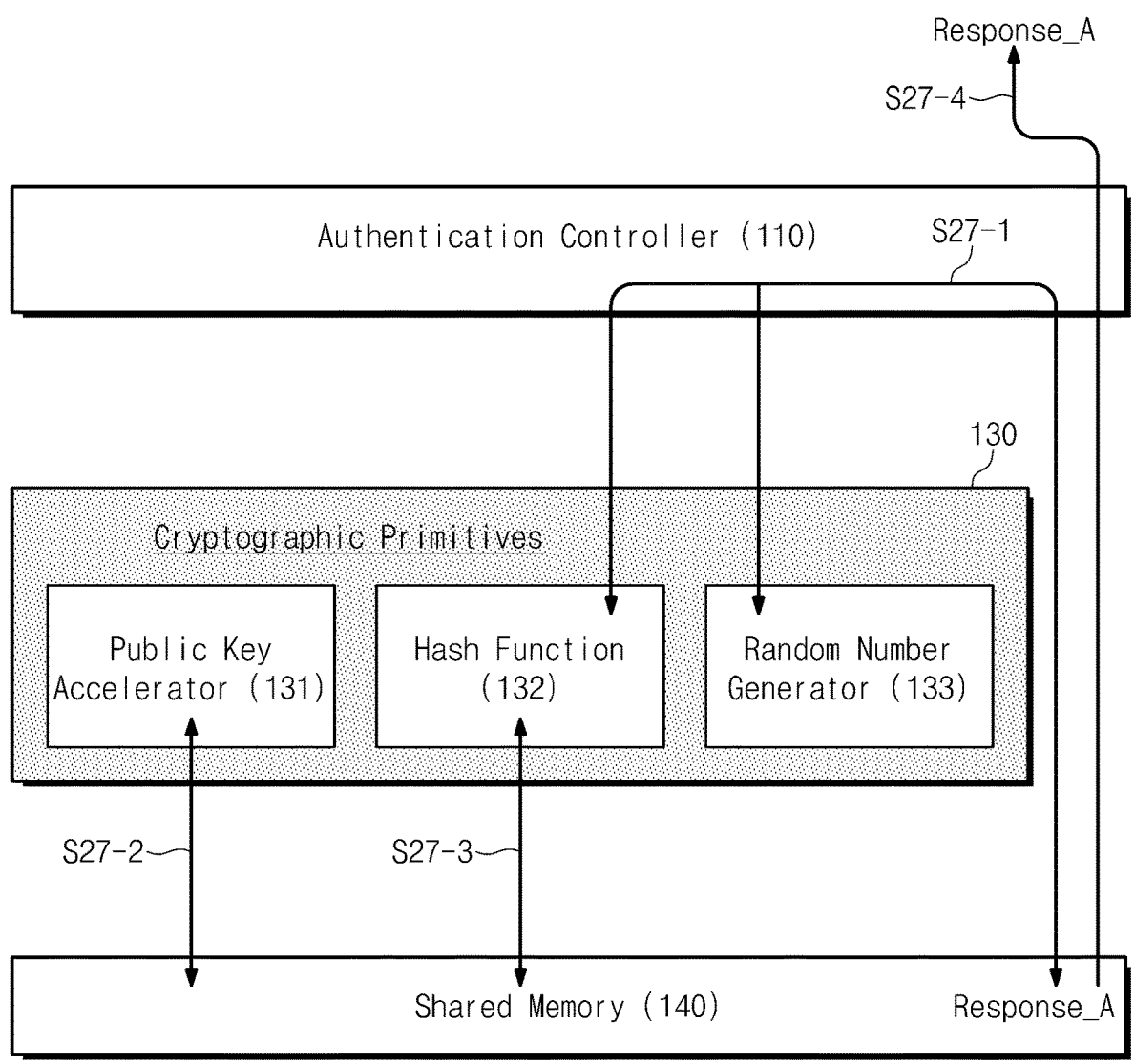
FIG. 19 is a block diagram for describing a procedure of generating a response of the authentication apparatus in response to a challenge to an opponent when an authentication apparatus according to an embodiment of the disclosure performs a mutual authentication protocol.

FIG. 19 is a block diagram for describing a procedure of generating a response of the authentication apparatus 100 in response to a challenge of an opponent when an authentication apparatus 100 according to an embodiment of the disclosure performs a mutual authentication protocol. Referring to FIGS. 14 to 19, a procedure of generating the response Response_A of the authentication apparatus 100 in response to the challenge Challenge_O of the opponent 400 will be described below.

To generate the response Response_A in response to the challenge Challenge_O of the opponent 400, the authentication controller 110 may control the cryptographic primitives 130 and the shared memory 140 (S27_1). To generate the response Response_A of the authentication apparatus 100, the public key accelerator 131 may repeatedly access the shared memory 140 (S27-2). Moreover, to generate the response Response_A of the authentication apparatus 100, the hash function 132 may repeatedly access the shared memory 140 (S27-3). The generated response Response_A may be transmitted to the opponent 400 via the authentication controller 110 (S27-4).

Figure 20:
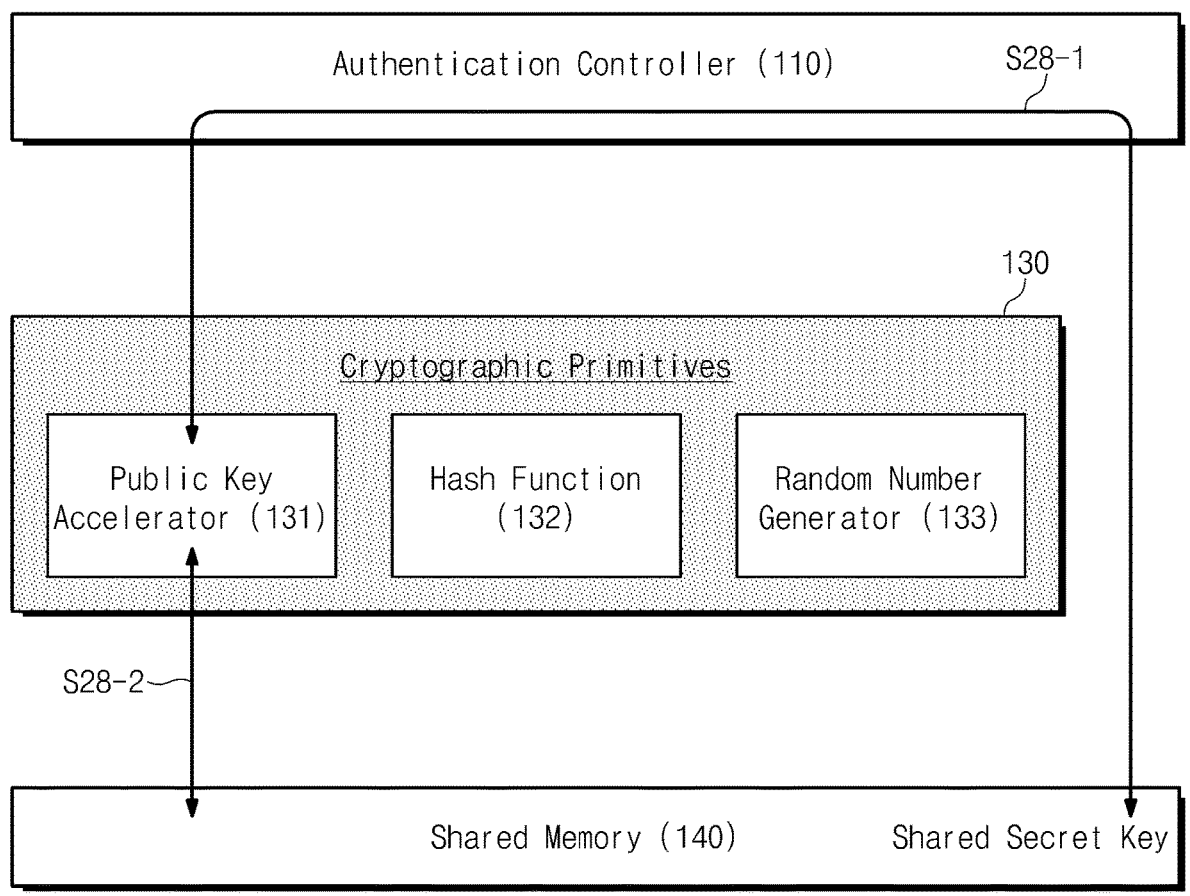
FIG. 20 is a block diagram for describing a procedure of generating a shared secret key when an authentication apparatus according to an embodiment of the disclosure performs a mutual authentication protocol.

FIG. 20 is a block diagram for describing a procedure of generating a shared secret key when an authentication apparatus 100 according to an embodiment of the disclosure performs a mutual authentication protocol. Referring to FIGS. 14 to 20, a procedure of generating a shared secret key will be described below.

The authentication controller 110 may generate the shared secret key by repeatedly accessing the public key accelerator 131 and the shared memory 140 (S28-1). To generate the shared secret key, the public key accelerator 131 may repeatedly access the shared memory 140 (S28-2).

Figure 21:
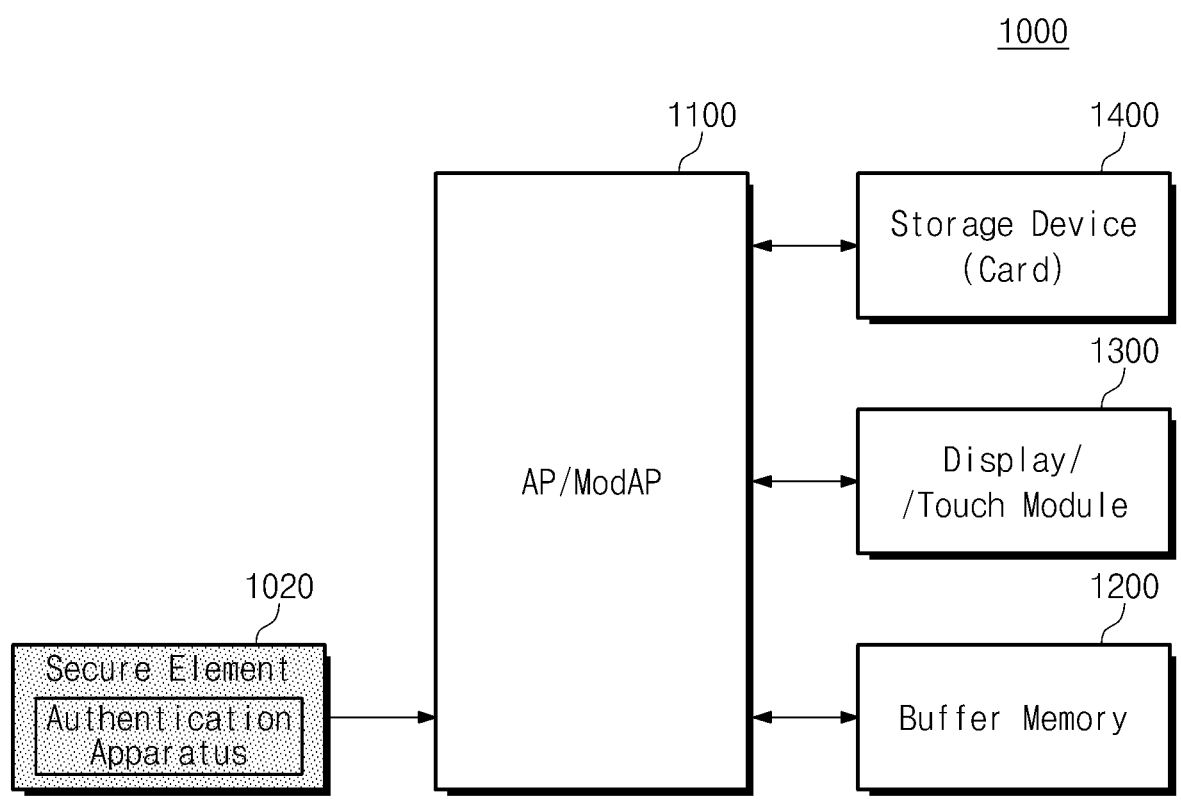
FIG. 21 is a block diagram illustrating a mobile device according to an embodiment of the disclosure.

FIG. 21 is a block diagram illustrating a mobile device according to an embodiment of the disclosure. Referring to FIG. 21, a mobile device 1000 may include a secure element 1020, a processor (AP/ModAP) 1100, a buffer memory 1200, a display/touch module 1300, and a storage device 1400.

The secure element 1020 may be implemented to provide an overall secure function of the mobile device 1000. The secure element 1020 may be implemented with software and/or tamper resistant hardware, may permit a high-level of security, and may work to collaborate on a trusted execution environment (TEE) of the processor 1100. The secure element 1020 may include a Native operating system (OS), a security storage device which is an internal data storage unit, an access control block which controls a right of access to the secure element 1020, a security function block for performing ownership management, key management, digital signature, encryption/decryption, and the like, and a firmware update block for updating firmware of the secure element 1020. For example, the secure element 1020 may be a universal IC card (UICC) (e.g., USIM, CSIM, and ISIM), a subscriber identity module (SIM) card, an embedded secure elements (eSE), a MicroSD, Stikers, and the like.

Moreover, the secure element 1020 according to an embodiment of the disclosure may include the authentication apparatus 100 described with reference to FIGS. 1 to 20. An embodiment of the disclosure is exemplified as the authentication apparatus 100 illustrated in FIG. 21 exists outside the processor 1100. However, the scope and spirit of the disclosure may not be limited thereto. For example, the authentication apparatus 100 according to an embodiment of the disclosure may exist in the processor 1100.

The processor 1100 may be implemented to control an overall operation of the mobile device 1000 and a wired/wireless communication with an external device. For example, the processor 1100 may be an application processor (AP), an integrated modem application processor (hereinafter referred to as "ModAP"), or the like.

The buffer memory 1200 may be implemented to temporarily store data, which is needed when the mobile device 1000 performs a process operation. The display/touch module 1300 may be implemented so as to display data processed from the processor 1100 or to receive data from a touch panel. The storage device 1400 may be implemented so as to store data of a user. The storage device 1400 may be an embedded multimedia card (eMMC), a solid state drive (SSD), a universal flash storage (UFS), or the like. The storage device 1400 may include at least one nonvolatile memory device.

The nonvolatile memory may be a NAND flash memory, a vertical NAND flash memory (VNAND), a NOR flash memory, a resistive random access memory (RRAM), a phase change memory (PRAM), a magneto-resistive random access memory (MRAM), a ferroelectric random access memory (FRAM), a spin transfer torque random access memory (STT-RAM), or the like.

Furthermore, the nonvolatile memory may be implemented to have a three-dimensional array structure. In an embodiment of the disclosure, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the disclosure, the 3D memory array includes vertical NAND strings that are vertically oriented such that at least one memory cell is located over another memory cell. The at least one memory cell may comprise a charge trap layer. Each vertical NAND string may include at least one select transistor located over memory cells. The at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648. The nonvolatile memory according to an exemplary embodiment of the disclosure may be applicable to a charge trap flash (CTF) in which an insulating layer is used as a charge storage layer, as well as a flash memory device in which a conductive floating gate is used as a charge storage layer.

A configuration of an authentication apparatus based on a public key cryptosystem may provide a method in which sub-components share and use a resource, a method of limiting a storage device in a component and utilizing a shared resource, a structure including the sub-component which performs an authentication protocol based on a public key cryptosystem in view of a sequence, and a structure in which the sub-component processes a public key certificate.

A hardware structure of the authentication apparatus based on a public key cryptosystem may provide a hardware device for performing an authentication protocol based on a public key cryptosystem and a device for managing a public key certificate.

Figure 22:
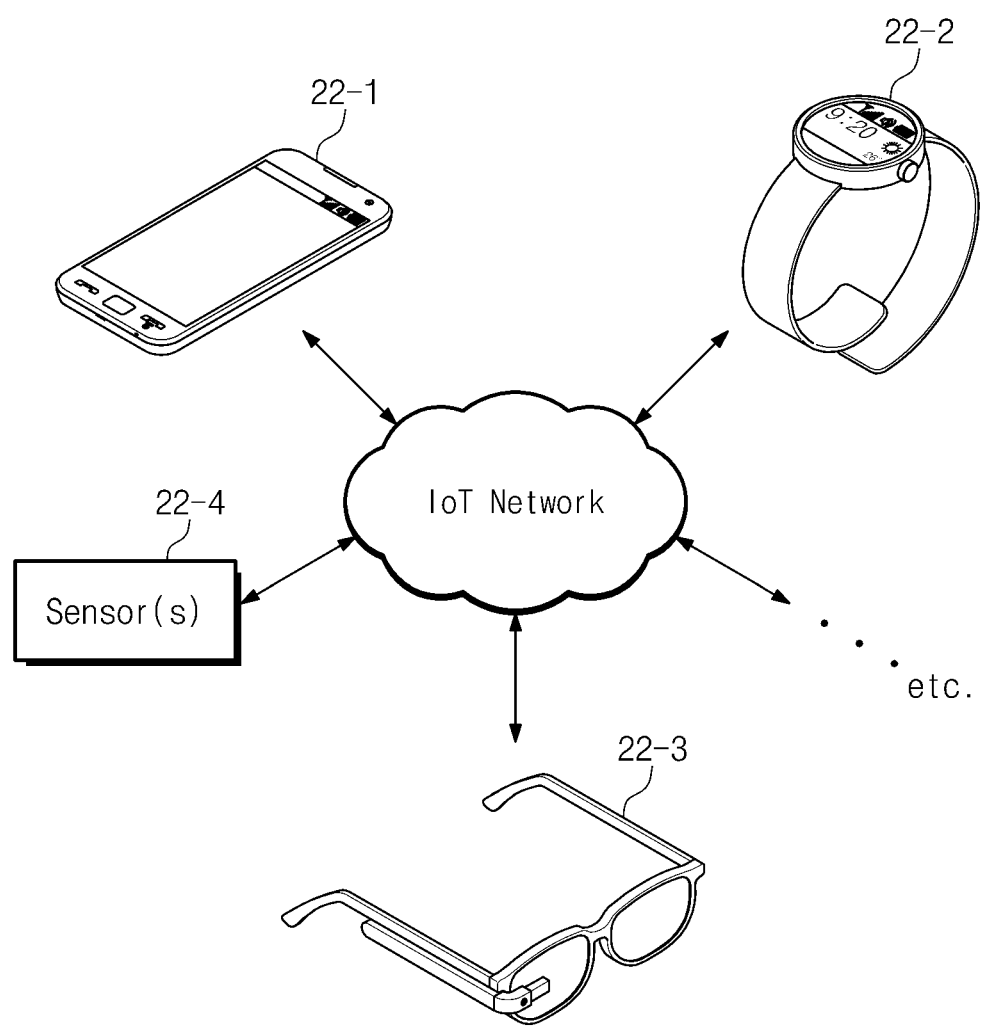
FIG. 22 is a schematic diagram illustrating an IoT network system according to an embodiment of the disclosure.

FIG. 22 is a schematic diagram illustrating an IoT network system according to an embodiment of the disclosure. Referring to FIG. 22, a mobile device 22-1, a wearable device 22-2, smart glasses 22-3, a sensor 22-4, or the like may include the authentication apparatus 100 according to an embodiment of the disclosure.

A product to which the disclosure is applied may include a device, which supports an authentication based on a public key cryptosystem, such as a light bulb, a thermometer, a motion sensor which support an IoT environment, a smartphone, a print toner, a smartphone flip-cover, an application processor, a display driver integrated circuit (DDI). Moreover, the disclosure may be applied to other devices which support an authentication based on a public key cryptosystem as well as the above-described devices.

An authentication apparatus according to an embodiment of the disclosure, a mobile device including the same, and an authentication method thereof may make it possible to reduce a size of a conventional memory which each of the components independently uses by sharing a memory and possible to eliminate a central processing unit (CPU) or a nonvolatile memory (NVM) by including a dedicated module which performs an authentication protocol. Accordingly, the authentication apparatus 100 may be lightened.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to exemplary embodiments, it will be apparent to those skilled in the art that various changes and modifications may be made without departing from the spirit and scope of the disclosure. Therefore, it should be understood that the above embodiments are not limiting, but illustrative.

What is claimed is:

1. An authentication apparatus included in a device supporting a network communication, the authentication apparatus comprising:
   an authentication controller that receives an authentication request from an opponent according to an authentication protocol, the authentication controller including a first register set by the authentication request;
   cryptographic primitives that generate a random number in response to the authentication request, generate a challenge corresponding to the random number, and verify a response from the opponent corresponding to the challenge;
   a certificate handler that receives a certificate from the opponent and verifies the certificate; and
   a shared memory shared by the authentication controller, the cryptographic primitives, and the certificate handler but not the opponent, wherein:
   the authentication apparatus differently sets a read or write right about first values generated during the authentication protocol or about second values for performing the authentication protocol,
   the cryptographic primitives store the random number and the challenge in the shared memory under control of the authentication controller, and
   the certificate handler stores the certificate in the shared memory under control of the authentication controller.

2. The authentication apparatus of claim 1, wherein the authentication controller comprises:
   registers that store values for performing the authentication protocol; and
   a one-time programmable memory that stores a certificate of the authentication apparatus.

3. The authentication apparatus of claim 2, wherein the registers comprise:
   a second register that indicates a start of the authentication protocol; and
   a third register that stores a result value of the authentication protocol.

4. The authentication apparatus of claim 2, wherein the certificate of the authentication apparatus comprises a public key of the authentication apparatus and a secret key of the authentication apparatus.

5. The authentication apparatus of claim 1, wherein the cryptographic primitives comprise:
   a public key accelerator that performs a modular operation or a point operation for generating the challenge or verifying the response;
   a hash function that receives the random number and generates the challenge based on a hash algorithm; and
   a random number generator that generates the random number in response to the authentication request.

6. The authentication apparatus of claim 5, wherein:
   the public key accelerator repeatedly accesses the shared memory through a first data line,
   the hash function repeatedly accesses the shared memory through a second data line, and
   the random number generator repeatedly accesses the shared memory through a third data line.

7. The authentication apparatus of claim 5, wherein the shared memory comprises at least one of:
   a first area that stores the challenge of the authentication apparatus;
   a second area that stores a response of the authentication apparatus;
   a third area that stores the certificate of the opponent;
   a fourth area that stores a challenge of the opponent;
   a fifth area that stores the response of the opponent;
   a sixth area that stores an intermediate value when the authentication protocol is performed; and
   a seventh area that stores a hashed value of the hash function.

8. The authentication apparatus of claim 7, wherein at least one value stored in the first to seventh areas is reused by at least one of the certificate handler, the cryptographic primitives, and the authentication controller.

9. The authentication apparatus of claim 8, further comprising a predetermined data line that transmits the at least one value.

10. The authentication apparatus of claim 1, wherein the authentication controller differently sets a read or write right of a register corresponding to an operation step when the authentication protocol is performed.

11. A mobile device comprising:
    a first component; and
    a second component, wherein:
    the first component comprises an authentication apparatus, and the authentication apparatus comprises:
       an authentication controller that receives an authentication request from an opponent which is the second component according to an authentication protocol, the authentication controller including a first register set by the authentication request;
       cryptographic primitives that generate a random number, generate a challenge corresponding to the random number, and verify a response from the opponent corresponding to the challenge;
       a certificate handler that receives a certificate from the opponent and verifies the certificate; and
       a shared memory shared by the authentication controller, the cryptographic primitives, and the certificate handler but not the opponent,
    the authentication apparatus differently sets a read or write right about first values generated during the authentication protocol or about second values for performing the authentication protocol,
    the cryptographic primitives store stores the random number and the challenge in the shared memory under control of the authentication controller, and
    the certificate handler stores the certificate in the shared memory under control of the authentication controller.

12. The mobile device of claim 11, wherein:
    the authentication protocol is a unilateral authentication protocol based on a public key cryptosystem, and
    the authentication apparatus performs an operation to receive the authentication request from the opponent, generates the challenge in response to the authentication request, transmits the challenge to the opponent, receives the certificate of the opponent and the response of the opponent from the opponent, and verifies the certificate of the opponent and the response of the opponent.

13. The mobile device of claim 12, wherein the authentication controller receives the authentication request from the opponent and sets a corresponding register in response to the authentication request.

14. The mobile device of claim 12, wherein:
the cryptographic primitives comprise a random number generator and a hash function, and
the authentication controller controls the random number generator, the hash function, and the shared memory so as to generate the random number with the random number generator in response to the authentication request, so as to store the random number in the shared memory, and so as to generate the challenge with the hash function by reusing the random number stored in the shared memory.

15. The mobile device of claim 12, wherein:
a certificate handler parses the certificate of the opponent and stores the certificate in the shared memory, and
the authentication controller receives the response of the opponent and stores the response in the shared memory.

16. The mobile device of claim 15, wherein:
the certificate handler verifies whether the certificate stored in the shared memory is valid, and
when the certificate of the opponent is valid, the authentication controller determines whether the response stored in the shared memory is valid, using the cryptographic primitives.

17. The mobile device of claim 11, wherein:
the authentication protocol is a mutual authentication protocol based on a public key cryptosystem, and
the mutual authentication protocol comprises:
  an operation to receive the authentication request from the opponent;
  an operation to generate the challenge in response to the authentication request;
  an operation to transmit the challenge and the certificate of the authentication apparatus;
  an operation to receive the certificate of the opponent, the response of the opponent, and the challenge of the opponent from the opponent;
  an operation to verify the certificate of the opponent and the response of the opponent;
  an operation to generate the response of the authentication apparatus in response to the challenge of the opponent; and
  an operation to generate a shared secret key when an authentication operation succeeds.

18. The mobile device of claim 11, wherein:
the mobile device is a smartphone, and
the opponent is a flip cover encasing the smartphone.

19. An authentication apparatus comprising:
a hash primitive that generates a challenge in response to an authentication request received from an opponent according to an authentication protocol;
a shared memory device that stores the challenge;
a control circuit that receives the challenge from the shared memory device and transmits the challenge to the opponent;
a certificate handler that stores a certificate, received from the opponent in response to the challenge, in the shared memory device, and verifies the certificate of the shared memory device;
the control circuit further stores a response, received from the opponent in response to the challenge, in the shared memory device; and
a public key accelerator primitive that receives the response from the shared memory device and verifies the response, wherein
the authentication apparatus differently sets a read or write right about first values generated during the authentication protocol or about second values for performing the authentication protocol, and
the shared memory device is shared by the hash primitive, the control circuit, the certificate handler, and the public key accelerator primitive but not the opponent.

20. The authentication apparatus of claim 19, wherein the public key accelerator primitive generates, upon verifying the response and certificate, an authentication result and stores the authentication result in the shared memory device.

* * * * *